(12) United States Patent
Ma et al.

(10) Patent No.: US 8,995,719 B2
(45) Date of Patent: Mar. 31, 2015

(54) TECHNIQUES FOR IMPROVED IMAGE DISPARITY ESTIMATION

(71) Applicant: Intel Corporation, Santa Clara, CA (US)

(72) Inventors: Tao Ma, Cincinnati, OH (US); Yi Wu, San Jose, CA (US); Oscar Nestares, San Jose, CA (US); Kalpana Seshadrinathan, Santa Clara, CA (US); Wei Sun, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 13/710,312

(22) Filed: Dec. 10, 2012

(65) Prior Publication Data

US 2014/0161306 A1    Jun. 12, 2014

(51) Int. Cl.
*G06K 9/00* (2006.01)
*G06K 9/32* (2006.01)

(52) U.S. Cl.
CPC ................................. *G06K 9/3233* (2013.01)
USPC ........... 382/103; 382/209; 382/275; 382/278; 358/3.26; 358/535

(58) Field of Classification Search
USPC .......... 382/209, 219, 275, 278; 358/3.26, 537
See application file for complete search history.

(56) References Cited

U.S. PATENT DOCUMENTS

| | | | |
|---|---|---|---|
| 6,363,381 B1 * | 3/2002 | Lee et al. ............................... | 1/1 |
| 6,788,825 B1 * | 9/2004 | Fujino ........................... | 382/266 |
| 7,206,462 B1 * | 4/2007 | Betke et al. .................... | 382/280 |
| 7,447,382 B2 | 11/2008 | Nestares et al. | |
| 7,689,016 B2 * | 3/2010 | Stoecker et al. .............. | 382/128 |
| 8,004,588 B2 * | 8/2011 | Lukac ............................ | 348/252 |
| 8,107,745 B2 * | 1/2012 | Todoroki ...................... | 382/233 |
| 8,228,560 B2 * | 7/2012 | Hooper ........................ | 358/3.27 |
| 8,253,856 B1 * | 8/2012 | Alvarez et al. ................ | 348/550 |
| 8,583,263 B2 * | 11/2013 | Hoffberg et al. ................ | 700/17 |

OTHER PUBLICATIONS

Okutomi et al., "A Multiple-Baseline Stereo", IEEE Transactions on Pattern Analysis and Machine Intelligence, vol. 15, No. 4, Apr. 1993.
Hamzah et al., "Sum of Absolute Differences Algorithm in Stereo Correspondence Problem for Stereo Matching in Computer Vision Application", IEEE Conference. Computer Science and Information Technology. 2010.

* cited by examiner

*Primary Examiner* — Yosef Kassa
(74) *Attorney, Agent, or Firm* — Kacvinsky Daisak Bluni PLLC

(57) ABSTRACT

Techniques for improved image disparity estimation are described. In one embodiment, for example, an apparatus may comprise a processor circuit and an imaging management module, and the imaging management module may be operable by the processor circuit to determine a measured horizontal disparity factor and a measured vertical disparity factor for a rectified image array, determine a composite horizontal disparity factor for the rectified image array based on the measured horizontal disparity factor and an implied horizontal disparity factor, and determine a composite vertical disparity factor for the rectified image array based on the measured vertical disparity factor and an implied vertical disparity factor. Other embodiments are described and claimed.

30 Claims, 12 Drawing Sheets

*400*          FIG. 4          402
R1 ($Y_A = 0.00$)
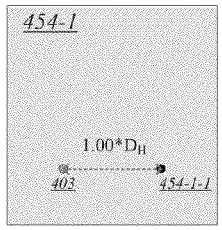 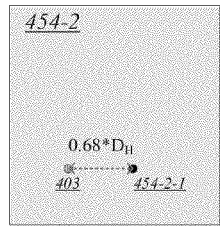 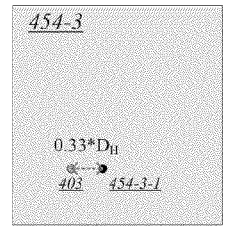 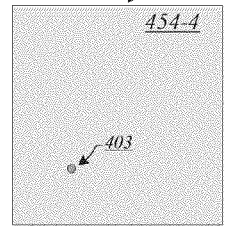
R2 ($Y_A = 0.32$)
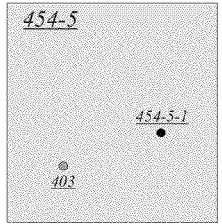 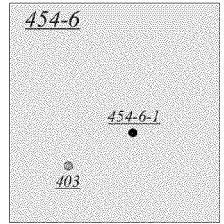 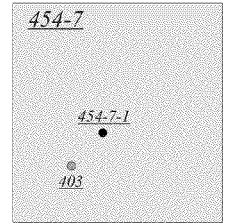 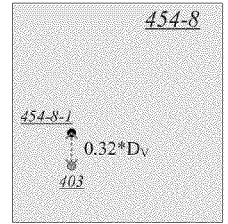
R3 ($Y_A = 0.67$)
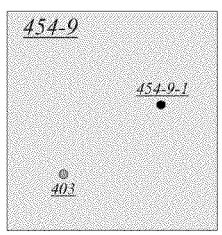 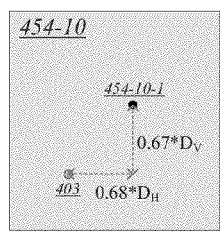 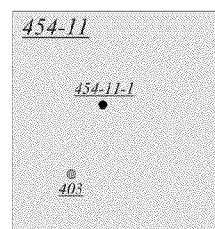 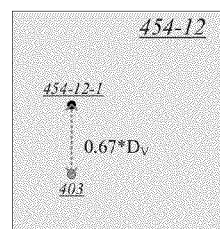
R4 ($Y_A = 1.00$)
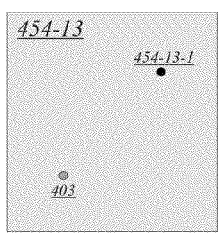 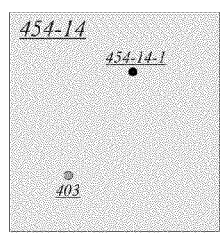 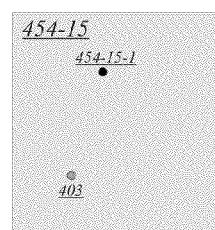 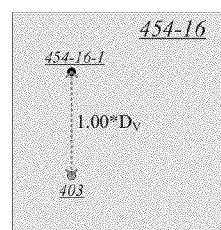
C1 ($X_A = 1.00$)    C2 ($X_A = 0.68$)    C3 ($X_A = 0.33$)    C4 ($X_A = 0.00$)

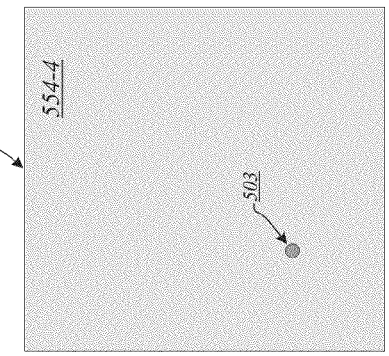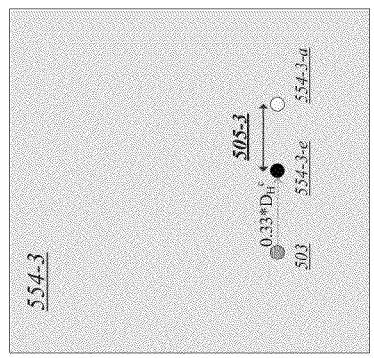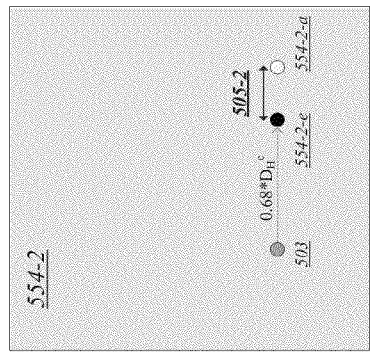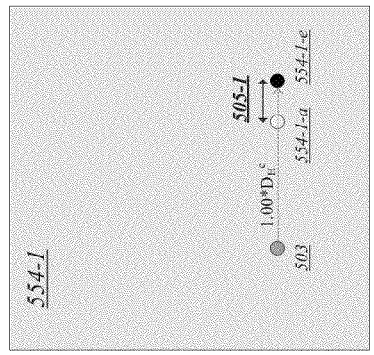
FIG. 5

FIG. 11
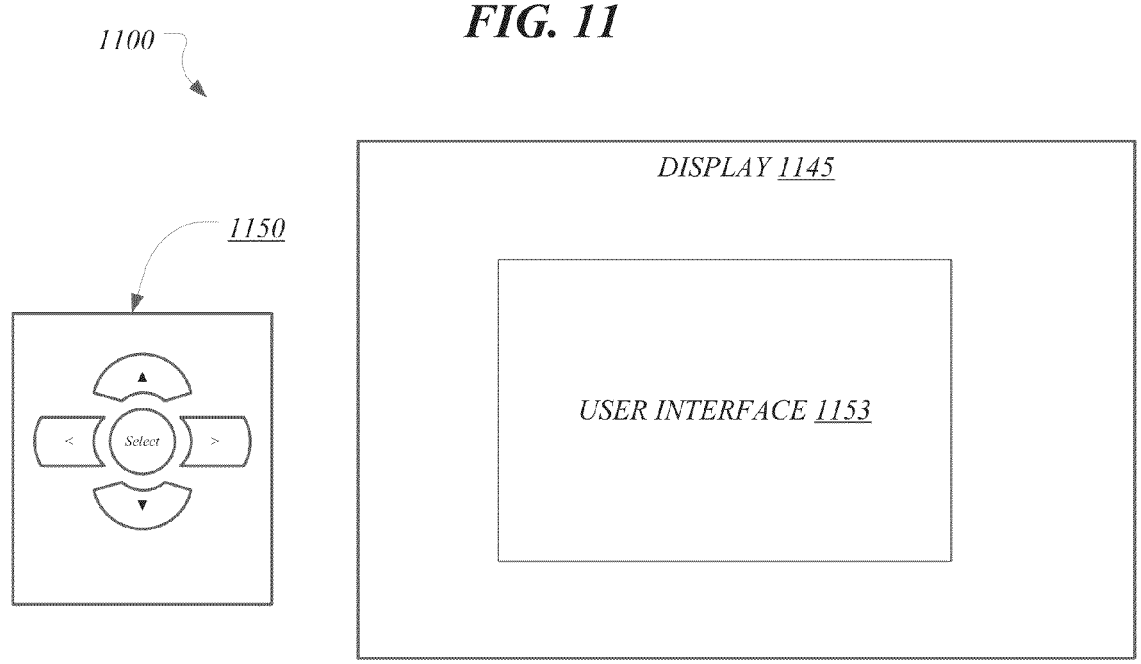
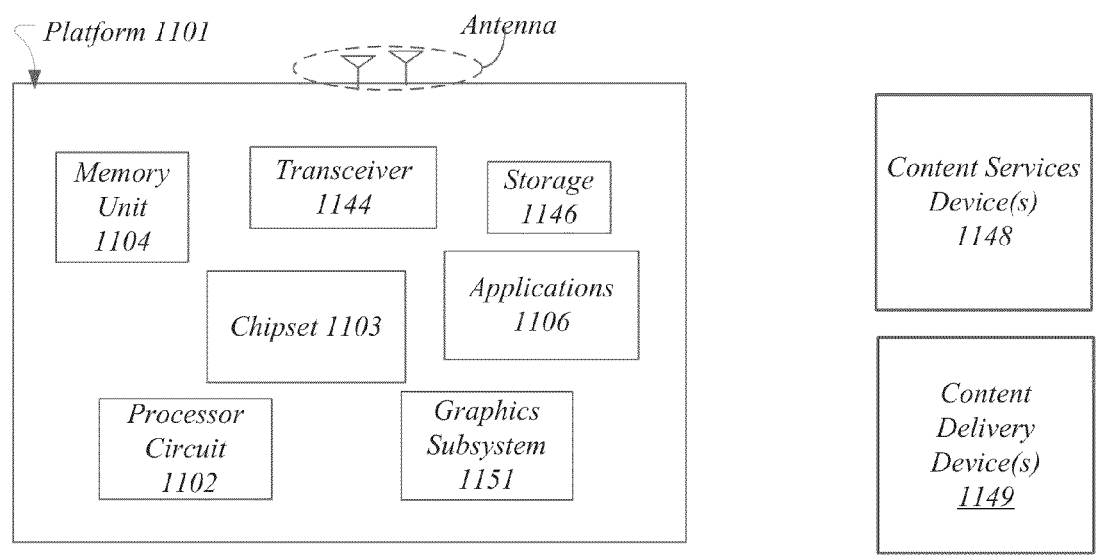
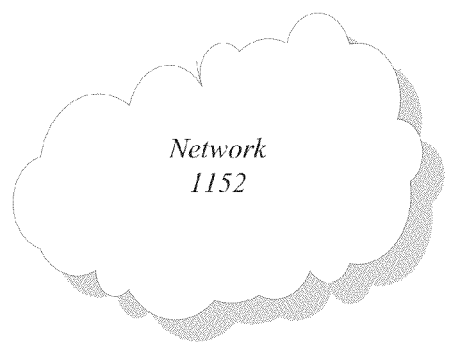

TECHNIQUES FOR IMPROVED IMAGE DISPARITY ESTIMATION

BACKGROUND

In the field of image acquisition and processing, it may be desirable to generate a composite image based on a set of images captured by a two-dimensional camera array. Generating such a composite image may involve combining some or all of the captured images. Combining the captured images may require an accurate determination of correspondences between positions and/or pixels within the respective captured images. Based on such correspondences, depths may be estimated for objects and/or features associated with those positions and/or pixels. The accuracy with which such correspondences may be determined may depend on the accuracy of one or more image disparity factors by which they are characterized. Accordingly, techniques for improved image disparity estimation may be desirable.

BRIEF DESCRIPTION OF THE DRAWINGS

FIG. 4 illustrates one embodiment of a second rectified image array.

FIG. 5 illustrates one embodiment of a third rectified image array.

FIG. 11 illustrates one embodiment of a third system.

DETAILED DESCRIPTION

Various embodiments may be generally directed to techniques for improved image disparity estimation. In one embodiment, for example, an apparatus may comprise a processor circuit and an imaging management module, and the imaging management module may be operable by the processor circuit to determine a measured horizontal disparity factor and a measured vertical disparity factor for a rectified image array, determine a composite horizontal disparity factor for the rectified image array based on the measured horizontal disparity factor and an implied horizontal disparity factor, and determine a composite vertical disparity factor for the rectified image array based on the measured vertical disparity factor and an implied vertical disparity factor. In this manner, the various rectified images of the rectified image array may be more accurately combined. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
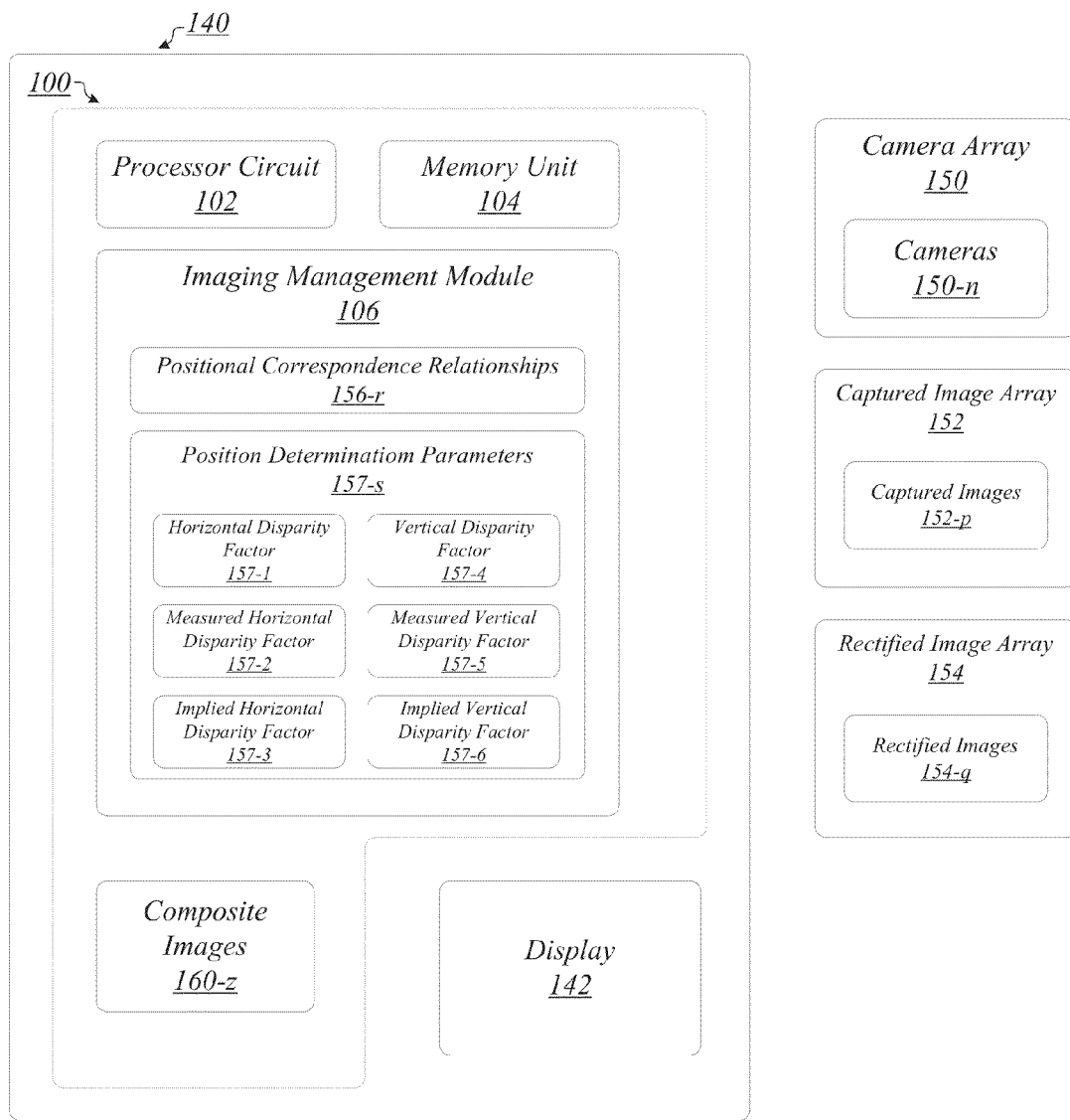
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an imaging management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an imaging management module 106. Imaging management module 106 may comprise logic, algorithms, and/or instructions operative to capture, process, edit, compress, store, print, and/or display one or more images. In some embodiments, imaging management module 106 may comprise programming routines, functions, and/or processes implemented as software within an imaging application or operating system. In various other embodiments, imaging management module 106 may be implemented as a standalone chip or integrated circuit, or as circuitry comprised within processor circuit 102 or within a graphics chip or other integrated circuit or chip. The embodiments are not limited in this respect.

FIG. 1 also illustrates a block diagram of a system 140. System 140 may comprise any of the aforementioned elements of apparatus 100. System 140 may further comprise a display 142. Display 142 may comprise any display device capable of displaying information received from processor circuit 102. Examples for display 142 may include a television, a monitor, a projector, and a computer screen. In one embodiment, for example, display 142 may be implemented by a liquid crystal display (LCD), light emitting diode (LED) or other type of suitable visual interface. Display 142 may comprise, for example, a touch-sensitive color display screen. In various implementations, display 142 may comprise one or more thin-film transistors (TFT) LCD including embedded transistors. In various embodiments, display 142 may be arranged to display a graphical user interface operable to directly or indirectly control imaging management module 106. For example, in some embodiments, display 142 may be arranged to display a graphical user interface generated by an imaging application implementing imaging management module 106. In such embodiments, the graphical user interface may enable operation of imaging management module 106 to capture, process, edit, compress, store, print, and/or display one or more images. The embodiments, however, are not limited to these examples.

In some embodiments, apparatus 100 and/or system 140 may be configurable to communicatively couple with a camera array 150. Camera array 150 may comprise a plurality of cameras 150-$n$. It is worthy of note that "n" and similar designators as used herein are intended to be variables representing any positive integer. Thus, for example, if an implementation sets a value for n=4, then a complete set of cameras 150-$n$ may include cameras 150-1, 150-2, 150-3, and 150-4. It is worthy of note that although camera array 150 is illustrated as being external to apparatus 100 and system 140 in FIG. 1, in some embodiments, camera array 150 may be comprised within apparatus 100 and/or system 140. The embodiments are not limited in this context.

In various embodiments, camera array 150 may comprise a two-dimensional (2D) camera array. A 2D camera array may comprise a camera array in which the optical centers of the cameras therein are situated in—or approximately situated in—a common plane in three-dimensional space, and arranged in—or approximately arranged in—multiple rows and columns within their common plane. It is worthy of note that because the optical centers of the cameras within a 2D camera array may be situated approximately on—but not necessarily precisely on—the common plane, the actual arrangement of optical centers in a particular 2D camera array may be three-dimensional. The embodiments are not limited in this context.

Figure 2A:
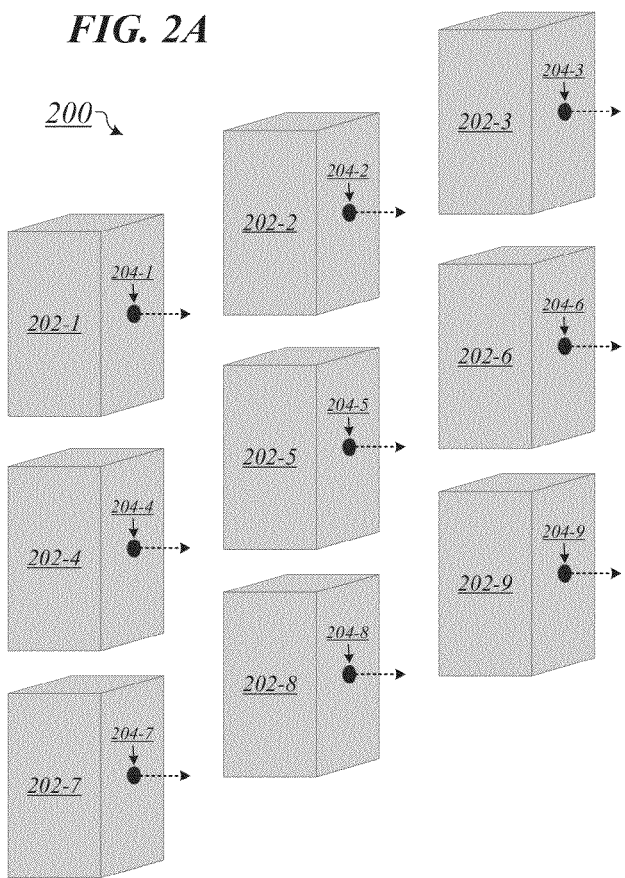
FIG. 2A illustrates one embodiment of a camera array.

An example of a camera array 200 is illustrated in FIG. 2A. As shown in FIG. 2A, camera array 200 comprises nine cameras, labeled 202-1 to 202-9, oriented as illustrated by the dashed arrows included therein. Each camera 202-$n$ in camera array 200 comprises a respective optical center 204-$n$. For example, camera 202-1 comprises an optical center 204-1. The embodiments are not limited to this example.

Figure 2B:
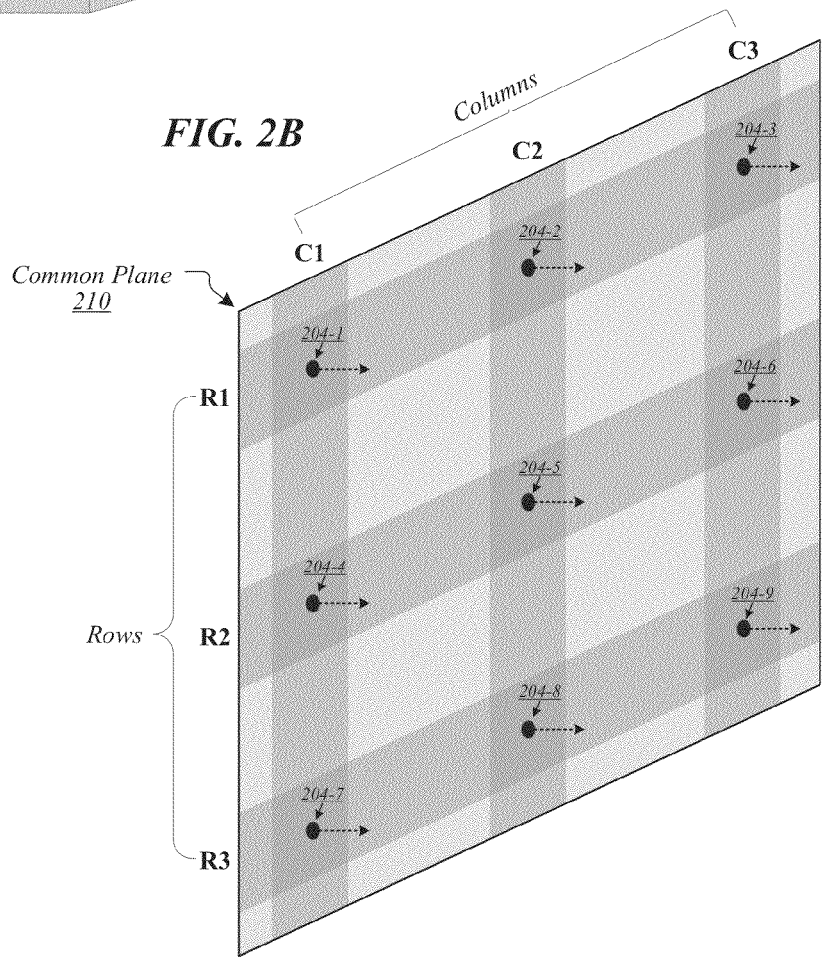
FIG. 2B illustrates a second embodiment of the camera array.

FIG. 2B demonstrates that camera array 200 of FIG. 2A may comprise a 2D camera array. Included in FIG. 2B are the optical centers 204-$n$ of the cameras 202-$n$ in camera array 200 of FIG. 2A. As shown in FIG. 2B, these optical centers 204-$n$ are situated in—or approximately in—a common plane 210, and reside—or approximately reside—in respective rows R1, R2, and R3 and columns C1, C2, and C3 within common plane 210. For example, optical centers 204-1, 204-4, and 204-7 all reside or approximately reside in column C1, and optical centers 204-7, 204-8, and 204-9 all reside or approximately reside in row R3. The embodiments are not limited to these examples. It is worthy of note that although nine cameras 202-$n$ arranged in three rows and three columns are featured in the example 2D camera array of FIGS. 2A and 2B, 2D camera arrays comprising lesser or greater numbers of cameras and corresponding optical centers, rows, and columns are both possible and contemplated, and the embodiments are not limited in this context.

Returning to FIG. 1, in operation, a camera array 150 such as the 2D camera array 200 illustrated in FIGS. 2A and 2B may capture a plurality of captured images 152-$p$, which may be regarded as comprising a captured image array 152. A captured image array 152 comprising captured images 152-$p$ captured by a 2D camera array 150 may be termed a 2D captured image array. In some embodiments, captured image array 152 may comprise a number of captured images 152-$p$ that is equal to the number of cameras 150-$n$ in the camera array 150, and each of the captured images 152-$p$ may comprise an image captured by a corresponding one of the cameras 150-$n$. In various embodiments, there may be potential benefits associated with generating one or more composite images 160-$z$ based on the various captured images 152-$p$ in captured image array 152. For example, in some embodiments, combining information comprised within the various captured images 152-$p$ may be enable the generation of one or more composite images 160-$z$ having desired and/or improved characteristics with respect to the various captured images 152-$p$. In an example embodiment, information it may be possible to generate a composite image 160-$z$ having a greater level of clarity, detail, or focus than any or all of the captured images 152-$p$, by combining information comprised within the various captured images 152-$p$. As such, in various embodiments, apparatus 100 and/or system 140, and/or one or more elements external to apparatus 100 and/or system 140, may be operative to generate one or more composite images 160-$z$ by combining information comprised within the various captured images 152-$p$ in captured image array 152.

In some embodiments, in order to facilitate combining information comprised within the various captured images 152-$p$ in captured image array 152, apparatus 100 and/or system 140, and/or one or more elements external to apparatus 100 and/or system 140, may be operative to determine one or more positional correspondence relationships 156-$r$ for the captured images 152-$p$. Each positional correspondence relationship 156-$r$ may identify a set of positions within the captured images 152-$p$ that correspond to each other. A position within a first captured image 152-$p$ and a position within a second captured image 152-$p$ may be said to correspond to each other when the two positions comprise visual information describing the same—or approximately the same—point in three-dimensional space, such as a point on an object, surface, person, landscape, or other physical entity or visual effect captured by the camera array 150. For example, if camera array 150 is used to capture a set of captured images 152-$p$ of a human face, a position within a first such captured image 152-$p$ and a position within a second such captured image 152-$p$ may be said to correspond to each other if they both reside at a same point—or approximately same point—on the face in their respective captured images 152-$p$. The embodiments are not limited in this context.

In various embodiments, positions identified by a positional correspondence relationship 156-$r$ may comprise the locations of pixels and/or groups of pixels within captured images 152-$p$. For example, a positional correspondence relationship 156-$r$ may identify two positions within two respective captured images 152-$p$ that correspond to each other, and each of those two positions may comprise a location of a particular pixel within its respective captured image 152-$p$. In such an example, the particular pixels whose locations are identified by the positional correspondence relationship 156-$r$ may be said to correspond to each other according to the positional correspondence relationship 156-$r$. The embodiments are not limited in this context.

Figure 3A:
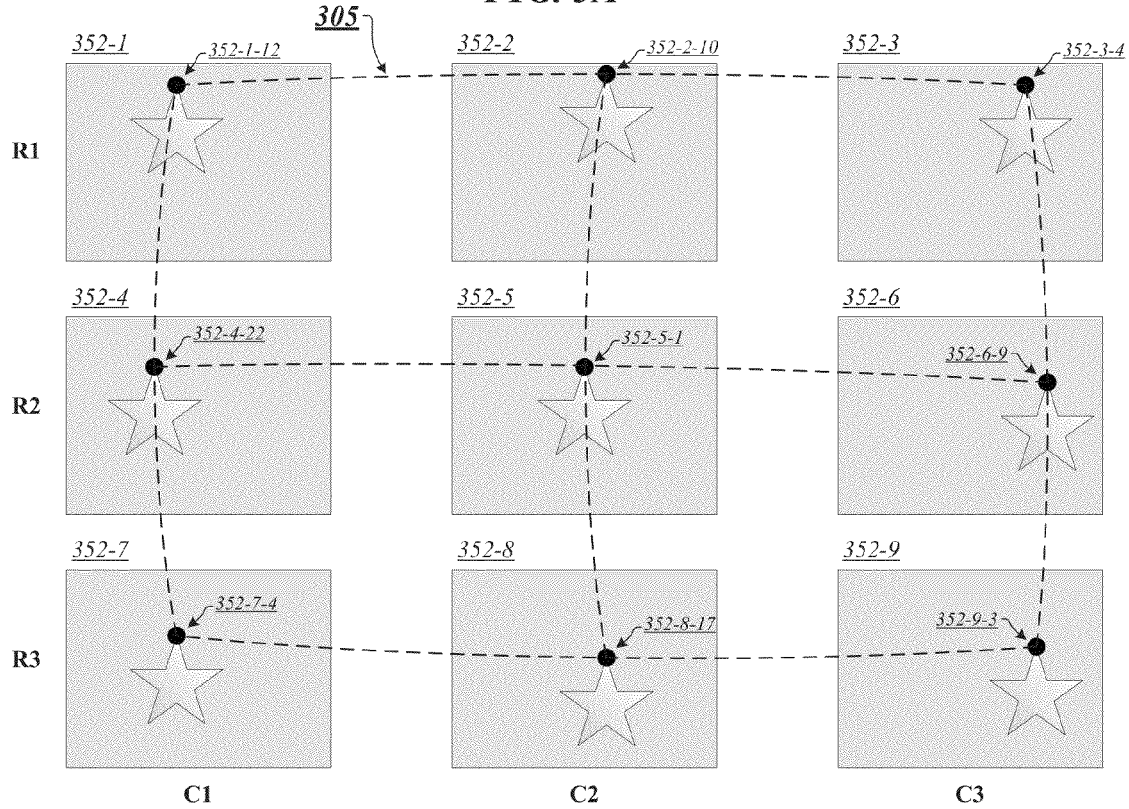
FIG. 3A illustrates one embodiment of a captured image array

An example of a positional correspondence relationship 305 is illustrated in FIG. 3A. Shown in FIG. 3A is a captured image array 300 comprising a set of nine captured images 352-$p$, such as may comprise an example of images captured by cameras 202-$n$ in the camera array 200 of FIG. 2A. Each captured image 352-$p$ may comprise a respective set of pixels 352-$p$-$i_p$. These captured images 352-$p$ are arranged according to the convention, used hereinafter, that in an array of captured images captured by a camera array, the captured images are arranged in rows and columns corresponding to those into which the optical centers of the cameras in the camera array are arranged. Hereinafter, based on this convention, any particular captured image—such as a captured image 352-$p$ in FIG. 3A, for example—shall be said to "reside" in a same row and column of its captured image array—such as captured image array 300 in FIG. 3A, for example—as the row and column of the camera array in which the optical center of the camera by which it was captured resides. For example, captured image 352-6 in FIG. 3A resides in row R2 and column C3 of captured image array 300. If captured image array 300 comprises captured images 352-$p$ captured by cameras 202-$n$ of FIG. 2A, then according to this convention, captured image 352-6 comprises an image captured by camera 202-6 of FIG. 2A, since the optical center 204-6 of camera 202-6 resides in row R2 and column C3 of camera array 200. It is to be understood that this convention is employed merely for purposes of clarity, and the embodiments are not limited in this context.

In the captured image array 300 of FIG. 3A, each captured image 352-$p$ comprises a five-pointed star, the upper most point of which resides at—or approximately at—a respective pixel 352-$p$-$i_p$ within the captured image 352-$p$. For example, the upper most point of the five-pointed star in captured image 352-1 resides at—or approximately at—a pixel 352-1-12. Since each of the pixels 352-$p$-$i_p$ in the various captured images 352-$p$ corresponds—or approximately corresponds—to the upper most point of the respective five-pointed star in that captured image 352-$p$, each of the pixels 352-$p$-$i_p$ may be said to correspond to each of the other pixels 352-$p$-$i_p$ according to positional correspondence relationship 305.

It is worthy of note that for any particular pixel 352-$p$-$i_p$ in a particular captured image 352-$p$, the value of $i_p$ as it is employed herein is meaningful only as an index value for that particular pixel 352-$p$-$i_p$ within the pixels of that particular captured image 352-$p$, and is not meaningful when compared to a value of $i_p$ for a pixel 352-$p$-$i_p$ in a different captured image 352-$p$. Thus the fact that pixel 352-3-4 in captured image 352-3 has a value of 4 for $i_3$ and pixel 352-7-4 in captured image 352-7 has that same value of 4 for $i_7$ does not indicate any meaningful relative relationship, property, or correspondence between pixels 352-3-4 and 352-7-4. Pixels 352-$p$-$i_p$ identified by equal index values $i_p$ within their respective captured images 352-$p$ may or may not correspond to each other, and pixels 352-$p$-$i_p$ that correspond to each other may or may not be identified by equal index values $i_p$ within their respective captured images 352-$p$. The embodiments are not limited in this context.

It is also worthy of note that positional correspondence relationship 305 is only partially illustrated in FIG. 3A. In FIG. 3A, corresponding pixels 352-$p$-$i_p$ within captured images 352-$p$ residing in common rows of captured image array 300 are connected by dashed lines, and corresponding pixels 352-$p$-$i_p$ within captured images 352-$p$ residing in common columns of captured image array 300 are also connected by dashed lines. Thus, for example, pixels 352-1-12, 352-4-22, and 352-7-4 are connected by a dashed line, since they reside in captured images 352-1, 352-4, and 352-7, respectively, and those three captured images reside in the same column C1. However, two particular pixels 352-$p$-$i_p$ need not lie within respective captured images 352-$p$ of a common row or column in order to correspond to each other, and dashed lines for such correspondences are omitted from FIG. 3A in the interest of clarity. Thus, for example, pixels 352-1-12 and 352-9-3 correspond to each other, since they both correspond—or approximately correspond—to the upper most points of the respective five-pointed stars in captured images 352-1 and 352-9, despite the fact that captured images 352-1 and 352-9 do not share a common row or column within captured image array 300, and thus that pixels 352-1-12 and 352-9-3 are not connected by a dashed line.

It is further worthy of note that the fact that two particular corresponding pixels 352-$p$-$i_p$ reside in captured images 352-$p$ sharing a common row or column within captured image array 300 does not necessarily mean that the two particular corresponding pixels 352-$p$-$i_p$ share a common vertical or horizontal coordinate within their respective captured images 352-$p$, a fact that is evidenced by the curvature of the dashed lines partially illustrating positional correspondence relationship 305 in FIG. 3A. For example, pixel 352-1-12 in captured image 352-1 corresponds to pixel 352-4-22 in captured image 352-4, and both captured images reside in column C1, but pixel 352-4-22 is found further to the left in captured image 352-4 than is pixel 352-1-12 in captured image 352-1.

Determining a particular positional correspondence relationship such as positional correspondence relationship 305 may comprise selecting a point or region of interest in a particular captured image among a set of captured images, identifying characteristics and/or features at that point or region of interest, and searching within other captured images within the set for points or regions comprising those characteristics and/or features. For example, determining positional correspondence relationship 305 may comprise selecting pixel 352-3-4 in captured image 352-3, determining that pixel 352-3-4 comprises a feature corresponding to the top of the five-pointed star, and searching within the remaining captured images 352-$p$ for pixels that comprise a same or similar feature. Determining whether particular positions and/or pixels comprise the same—or approximately same—characteristics and/or features may comprise the application of one or more matching algorithms. The embodiments are not limited in this context.

As noted above, the determination of positional correspondence relationships such as positional correspondence relationship 305 of FIG. 3A may be performed in order to facilitate generation of one or more composite images by combining information within the various captured images captured by the cameras of a camera array, such as the generation of a composite image 160-$z$ based on the captured images 152-$p$ captured by cameras 150-$n$ in camera array 150 of FIG. 1. However, determining positional correspondence relationships for captured image arrays such as captured image array 300 of FIG. 3A may be computationally intensive, because for each position in a particular captured image 352-$p$, a search must be conducted over both a horizontal and a vertical range of positions in a second captured image 352-$p$ if the correct corresponding position is to be located. For example, in order to locate within captured image 352-1 a pixel 352-1-$i_1$ corresponding to pixel 352-4-22 of captured image 352-4 in FIG. 3A, a search must be conducted over both a horizontal and a vertical range of pixels 352-1-$i_1$ in captured image 352-1, since neither the horizontal position or the vertical position of the correct pixel 352-1-$i_1$ within captured image 352-1 (which happens to be pixel 352-1-12 in the example of FIG. 3A) is known in advance.

Returning to FIG. 1, in order to reduce the scope of such searches for corresponding positions, and thus reduce the computational costs associated with determining positional correspondence relationships 156-$r$ and generating composite images 160-$z$, in various embodiments, apparatus 100 and/or system 140, and/or one or more elements external to apparatus 100 and/or system 140, may be operative to perform image rectification on captured images 152-$p$ to obtain a rectified image array 154 comprising rectified images 154-$q$, and to determine positional correspondence relationships 156-$r$ using the rectified images 154-$q$. A rectified image array 154 comprising rectified images 154-$q$ derived from captured images 152-$p$ in a captured image array 152 may be termed a 2D rectified image array. Performing image rectification on a particular set of captured images 152-$p$ may comprise transforming the set of captured images 152-$p$ to obtain a set of rectified images 154-$q$ in which corresponding positions of rectified images 154-$q$ sharing a common row within a rectified image array share a common horizontal coordinate within their respective rectified images 154-$q$, and corresponding positions of rectified images 154-$q$ sharing a common column within the rectified image array share a common vertical coordinate within their respective rectified images 154-$q$. Image rectification may simplify the process of determining inter-image position correspondences, by enabling searches for corresponding positions to be confined within lines defined by a single horizontal coordinate such as a pixel row, and/or a single vertical coordinate such as a pixel column. In some embodiments, performing image rectification on a captured image array such as captured image array 152 to obtain a rectified image array such as rectified image array 154 may comprise identifying a common plane for the underlying camera array 150, defining a composite orientation for the camera array 150 based on the common plane, and rotationally transforming the captured images 152-$p$ in the captured image array 152 based on the deviations of their capturing cameras' orientations from that of the camera array 150, the locations of their capturing cameras within the common plane, and/or the intrinsic parameters of their capturing cameras. The embodiments are not limited in this context.

Figure 3B:
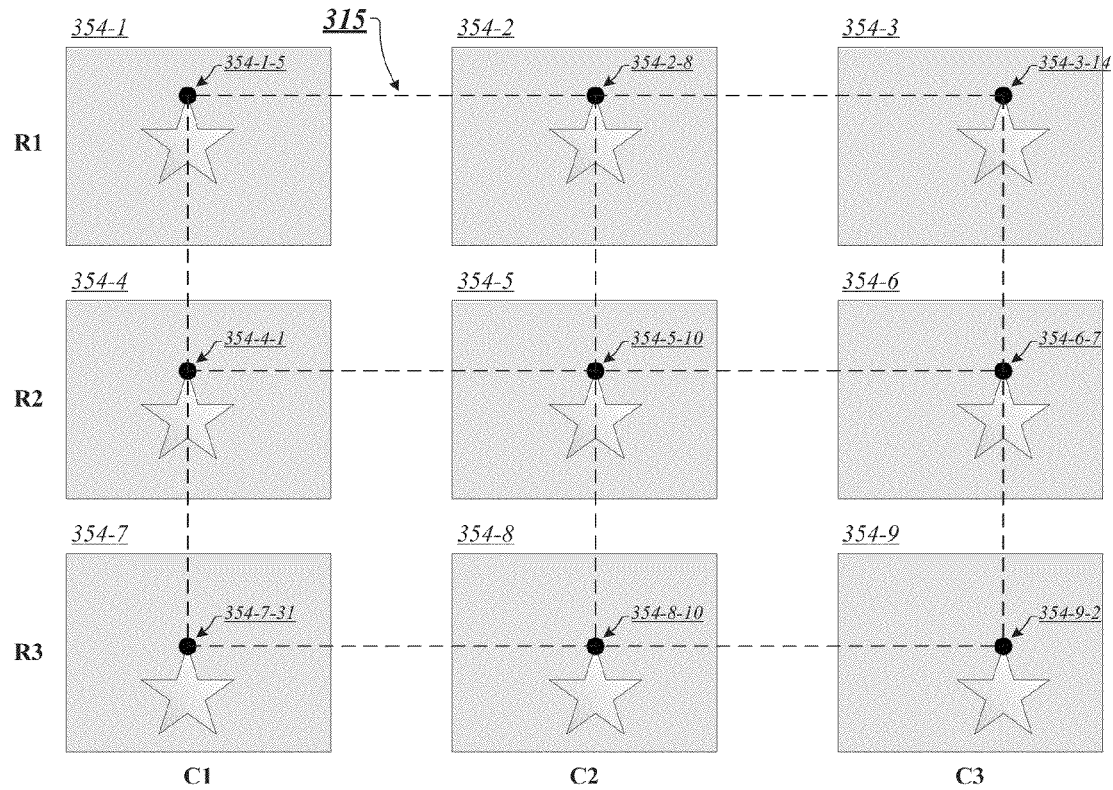
FIG. 3B illustrates one embodiment of a first rectified image array.

An example of a positional correspondence relationship 315 determined using rectified images is illustrated in FIG. 3B. Shown in FIG. 3B is a rectified image array 310, comprising a set of nine rectified images 354-$q$. Each rectified image 354-$q$ may comprise a respective set of pixels 354-$q$-$j_q$. The arrangement of these rectified images 354-$q$ in rectified image array 310 follows the same convention as that used for captured images 352-$p$ in captured image array 300, such that the rectified images 354-$q$ are arranged in rows and columns corresponding to those of captured image array 300 and those into which the optical centers of the cameras in the capturing camera array are arranged. Each rectified image 354-$q$ in rectified image array 310 of FIG. 3B comprises a rectified version of a corresponding captured image 352-$p$ in captured image array 300 of FIG. 3A. For example, rectified image 354-4 of FIG. 3B comprises a rectified version of captured image 352-4 of FIG. 3A, and each resides in row R2 and column C1 of its corresponding array. The embodiments are not limited to this example.

In the rectified image array 310 of FIG. 3B, each rectified image 354-$q$ still comprises a five-pointed star, the upper most point of which resides at—or approximately at—a pixel 354-$q$-$j_q$ within the rectified image 354-$q$. Since each of the pixels 354-$q$-$j_q$ in the various rectified images 354-$q$ corresponds—or approximately corresponds—to the upper most point of the respective five-pointed star in that rectified image 354-$q$, each of the pixels 354-$q$-$j_q$ may be said to correspond to each of the other pixels 354-$q$-$j_q$ according to positional correspondence relationship 315. It is worthy of note that like the value of $i_p$ as employed above, the value of $j_q$ for any particular pixel 354-$q$-$j_q$ as employed herein is meaningful only as an index value for that particular pixel 354-$q$-$j_q$ within the pixels of the particular rectified image 354-$q$, and is not meaningful when compared to a value of $j_g$ for a pixel 354-$q$-$j_q$ in a different rectified image 354-$q$ or when compared to a value of $i_p$ for a pixel 352-$p$-$i_p$ in a captured image 352-$p$. It is also worthy of note that like positional correspondence relationship 305 of FIG. 3A, positional correspondence relationship 315 of FIG. 3B is only partially illustrated, as dashed lines are included only for connections between corresponding pixels 354-$q$-$j_q$ within rectified images 354-$q$ residing in common rows or columns of rectified image array 310.

As shown in FIG. 3B, in rectified image array 310, corresponding pixels 354-$q$-$j_q$ residing in rectified images 354-$q$ sharing a common row or column will share a common vertical or horizontal coordinate within their respective rectified images 354-$q$. This fact is evidenced by the lack of curvature of the dashed lines partially illustrating positional correspondence relationship 315. For example, rectified images 354-4, 354-5, and 354-6 all reside in row R2 in rectified image array 310, and comprise mutually corresponding pixels 354-4-1, 354-5-10, and 354-6-7, respectively. Since rectified images 354-4, 354-5, and 354-6 all reside in the same row, corresponding pixels of rectified images 354-4, 354-5, and 354-6 will share a common vertical coordinate within their respective rectified images. Thus, although the horizontal positions of pixels 354-4-1, 354-5-10, and 354-6-7 within their respective rectified images 354-4, 354-5, and 354-6 are variable, their vertical positions within their respective rectified images are the same. Similarly, the vertical positions of pixels 354-3-14, 354-6-7, and 354-9-2 within their respective rectified images 354-3, 354-6, and 354-9 are variable, but since rectified images 354-3, 354-6, and 354-9 all reside in column C3, the horizontal positions of pixels 354-3-14, 354-6-7, and 354-9-2 within their respective rectified images 354-3, 354-6, and 354-9 are the same. The embodiments are not limited to these examples.

Determining a positional correspondence relationship 315 for rectified image array 310 may be less computationally intensive than determining a positional correspondence relationship 305 for captured image array 300 of FIG. 3A, because some of the searches for positions corresponding to a particular position may be focused based the horizontal and/or vertical coordinates of that position. For example, to locate, within rectified image 354-5 of rectified image array 310, a pixel 354-5-$j_5$ corresponding to pixel 354-8-10 in rectified image 354-8, a search may be focused on the pixels within rectified image 354-5 that reside at the same horizontal coordinate within rectified image 354-5 as does pixel 354-8-10 in rectified image 354-8. In contrast, a search to locate, within captured image 352-5 of captured image array 300 of FIG. 3A, a pixel 352-5-$i_5$ corresponding to pixel 352-8-17 in captured image 352-8 cannot be limited to pixels within captured image 352-5 that reside at the same horizontal coordinate within captured image 352-5 as does pixel 352-8-17 in captured image 352-8, because it is not known that the two corresponding pixels will share a common horizontal coordinate within their respective captured images. The embodiments are not limited to these examples.

Returning to FIG. 1, in various embodiments, empirically determining a complete set of positional correspondence relationships 156-$r$ for a rectified image array 154 may still be computationally prohibitive, despite the computational load reductions associated with the use of rectified images. Particularly, this may be the case when the number of unique positions and/or pixels within the respective rectified images 154-$q$ in the rectified image array 154 is large enough that determining a complete set of positional correspondence relationships 156-$r$ would involve the determination of hundreds or thousands of such relationships. In such embodiments, it may be desirable to instead determine one or more generalized parameters that approximately define the complete set of positional correspondence relationships 156-$r$ for the rectified image array 154. To that end, in some embodiments, in order to further facilitate combining information comprised within the various captured images 152-$p$, imaging management module 106, may be operative to determine one or more position determination parameters 157-$s$. Position determination parameters 157-$s$ may comprise generalized parameters operative to describe the approximate relative locations of corresponding positions within respective rectified images 154-$q$ in rectified image array 154. In various embodiments, given a particular position in a particular rectified image 154-$q$, for example, position determination parameters 157-$s$ may be operative to identify, within each other rectified image 154-$q$ in the rectified image array 154, a position corresponding to that particular position. As such, position determination parameters 157-$s$ may approximately define a complete set of positional correspondence relationships 156-$r$ for the rectified image array 154. The embodiments are not limited to this example.

In some embodiments, a particular position determination parameter 157-$s$ may comprise a parameter describing a position in a particular rectified image 154-$q$ based on a relative location within camera array 150 of a particular camera 150-$n$ to which the particular rectified image 154-$q$ corresponds. In various such embodiments, the position determination parameter 157-$s$ may describe the position in the particular rectified image 154-$q$ based on the relative location of the particular camera 150-$n$ to which the particular rectified image 154-$q$ corresponds with respect to a reference camera within the camera array 150. The embodiments are not limited in this context.

In some embodiments, position determination parameters 157-$s$ may comprise a horizontal disparity factor 157-1. Horizontal disparity factor 157-1 may comprise a parameter describing the horizontal coordinates—within their respective rectified images 154-$q$—of corresponding positions in the various rectified images 154-$q$, based on the horizontal locations—within the camera array 150—of the various cameras 150-$n$ to which the various rectified images 154-$q$ correspond. In various such embodiments, horizontal disparity factor 157-1 may comprise an estimated magnitude by which the horizontal coordinates of a position in a rectified image 154-$q$ differ from the horizontal coordinates of a reference position within a reference image as the horizontal distance within the camera array 150 increases between a camera 150-$n$ to which the rectified image 154-$q$ corresponds and a reference camera to which the reference image corresponds. Based on the above-noted convention employed herein with respect to image arrays, horizontal disparity factor 157-1 may also be said to comprise an estimated magnitude by which the horizontal coordinates of the position in the rectified image 154-$q$ differ from the horizontal coordinates of the reference position within the reference image as the horizontal distance within a corresponding rectified image array increases between the rectified image 154-$q$ and the reference image. The embodiments are not limited in this context.

In some embodiments, position determination parameters 157-$s$ may comprise a vertical disparity factor 157-4. Vertical disparity factor 157-4 may comprise a parameter describing the vertical coordinates—within their respective rectified images 154-$q$—of corresponding positions in the various rectified images 154-$q$, based on the vertical locations—within the camera array 150—of the various cameras 150-$n$ to which the various rectified images 154-$q$ correspond. In various such embodiments, vertical disparity factor 157-4 may comprise an estimated magnitude by which the vertical coordinates of a position in a rectified image 154-$q$ differ from the vertical coordinates of a reference position within a reference image as the vertical distance within the camera array 150 increases between a camera 150-$n$ to which the rectified image 154-$q$ corresponds and a reference camera to which the reference image corresponds. Based on the above-noted convention employed herein with respect to image arrays, vertical disparity factor 157-4 may also be said to comprise an estimated magnitude by which the vertical coordinates of the position in the rectified image 154-$q$ differ from the vertical coordinates of the reference position within the reference image as the vertical distance within a corresponding rectified image array increases between the rectified image 154-$q$ and the reference image. The embodiments are not limited in this context.

FIG. 4 illustrates an example of a rectified image array 400 in which the positions of corresponding pixels 454-$q$-$j_q$ in the various rectified images 454-$q$ are determined using a horizontal disparity factor and a vertical disparity factor. In the interest of clarity, visual features are omitted from the various rectified images 454-$q$, dashed positional correspondence lines are also omitted, and a value of $j_q$=1 has been used for each corresponding pixel 454-$q$-$j_q$ among the various rectified images 454-$q$. In FIG. 4, rectified image 454-4 is defined as the reference image 402 upon which the horizontal disparity factor and the vertical disparity factor are based. For each row in rectified image array 400, a value is specified for $Y_A$, which describes the vertical location of rectified images 454-$q$ in that row as a percentage of the difference between the vertical location of the reference image 402 and that of the furthest row from the reference image 402, which is row R4. For example, the value of $Y_A$ for row R3 is 0.67, indicating that the rectified images 454-$q$ in row R3 are situated 67 percent of the way from the vertical location of reference image 402 to the vertical location of the rectified images 454-$q$ in row R4.

Similarly, for each column in rectified image array 400, a value is specified for $X_A$, which describes the horizontal location of rectified images 454-$q$ in that column as a percentage of the difference between the horizontal location of the reference image 402 and that of the furthest row from the reference image 402, which is column C1. For example, the value of $X_A$ for column C3 is 0.33, indicating that the rectified images 454-$q$ in column C3 are situated 33 percent of the way from the horizontal location of reference image 402 to the horizontal location of the rectified images 454-$q$ in column C1. In some embodiments, the difference between the horizontal location of the reference image 402 and that of the furthest row from the reference image 402 may be referred to as the longest horizontal baseline, and the difference between the vertical location of the reference image 402 and that of the furthest row from the reference image 402 may be referred to as the longest vertical baseline. The embodiments are not limited in this context.

For each rectified image 454-$q$ in rectified image array 400, the horizontal and vertical coordinates of a pixel 454-$q$-$j_q$ that corresponds to reference pixel 403 in reference image 402 may be determined by multiplying the horizontal disparity factor $D_H$ by $X_A$ and the vertical disparity factor $D_V$ by $Y_A$, and translating the horizontal and vertical coordinates of the reference pixel 403 by the respective results. Thus, for example, the vertical position of the pixel 454-12-1 is determined by multiplying the vertical disparity factor $D_V$ by 0.67 and translating the vertical coordinate of the reference pixel 403 by the result. Similarly, the horizontal position of the pixel 454-2-1 is determined by multiplying the horizontal disparity factor $D_H$ by 0.68 and translating the horizontal coordinate of the reference pixel 403 by the result. Likewise, the horizontal position of the pixel 454-101-1 is determined by multiplying the horizontal disparity factor $D_H$ by 0.68 and translating the horizontal coordinate of the reference pixel 403 by the result, and the vertical position of the pixel 454-10-1 is determined by multiplying the vertical disparity factor $D_V$ by 0.67 and translating the vertical coordinate of the reference pixel 403 by the result. The embodiments are not limited to these examples.

Returning to FIG. 1, in general operation, apparatus 100 and/or system 140 may be operative to receive a set of captured images 152-$p$ captured by camera array 150-$n$, and/or may be operative to generate or to receive a set of rectified images 154-$q$ based on such captured images 152-$p$. In various embodiments, in order to facilitate the generation of one or more composite images 160-$z$ based on the set of captured images 152-$p$ and/or the set of rectified images 154-$q$, imaging management module 106 may be operative to determine one or more position determination parameters 157-$s$ for the set of captured images 152-$p$ and/or the set of rectified images 154-$q$. In some such embodiments, the position determination parameters 157-$s$ may comprise a horizontal disparity factor 157-1 and/or a vertical disparity factor 157-4 for the set of captured images 152-$p$ and/or for the set of rectified images 154-$q$. The embodiments are not limited in this context.

In various embodiments, in order to determine a horizontal disparity factor 157-1 for rectified image array 154, imaging management module 106 may be operative to first determine a measured horizontal disparity factor 157-2 for rectified image array 154. In some embodiments, the measured horizontal disparity factor 157-2 may comprise an estimated number of pixels by which the horizontal coordinates of any particular reference position in a reference image are expected to differ from the horizontal coordinates of corresponding positions in rectified images 154-$q$ residing in a furthest column from that of the reference image.

In various embodiments, imaging management module 106 may be operative to determine the measured horizontal disparity factor 157-2 for the rectified image array 154 by determining a value that minimizes a total pixel matching error over a longest horizontal baseline of the rectified image array 154. In some embodiments, the rectified image array 154 may comprise a plurality of columns, and the longest horizontal baseline of the rectified image array 154 may comprise a distance between the farthest left column and the farthest right column of the rectified image array 154.

In various embodiments, imaging management module 106 may be operative to determine the measured horizontal disparity factor 157-2 for the rectified image array 154 by performing an iterative process. In each iteration, a horizontal candidate value may be selected that comprises a candidate value for a horizontal disparity factor, and a horizontal error associated with that horizontal candidate value may be determined. In some embodiments, each horizontal candidate value may represent a number of pixels. In various embodiments, in each iteration, the horizontal candidate value may be determined by incrementing the horizontal candidate value used in the previous iteration. In some embodiments, the iterative process may conclude when the horizontal candidate value reaches a horizontal disparity value limit. At the conclusion of the iterative process, the horizontal candidate value with which a minimized horizontal error is associated may be determined as the measured horizontal disparity factor 157-2 for the rectified image array 154. In various embodiments, a horizontal pixel matching error value may be computed for each horizontal candidate value according to a horizontal pixel matching error function. In some such embodiments, the horizontal candidate value with which the minimized horizontal error is associated may be determined as a horizontal candidate value among those selected for evaluation for which a smallest horizontal pixel matching error value is computed. The embodiments are not limited in this context.

FIG. 5 illustrates an example of a rectified image array based on which a horizontal error may be calculated for a horizontal candidate value. Shown in FIG. 5 is a rectified image array 500, which has been truncated to display only a top row R1. The rectified image array 500 comprises columns C1, C2, C3, and C4, in which rectified images 554-1, 554-2, 554-3, and 554-4 reside, respectively. Rectified image 554-4 is selected as a reference image 502, and a pixel therein is selected as a reference pixel 503. Shown within each of rectified images 554-1, 554-2, and 554-3 is the position corresponding to reference pixel 503, as well as respective pixels 554-$q$-$a$ and 554-$q$-$e$. In each of rectified images 554-1, 554-2, and 554-3, the respective pixel 554-$q$-$a$ indicates the actual position of the pixel corresponding to the reference pixel 503 in reference image 502, and the respective pixel 554-$q$-$e$ indicates the expected position of that pixel, based on a horizontal candidate value $D_H^c$. Similarly to FIG. 4, the expected positions 554-$q$-$e$ in rectified images 554-1, 554-2, and 554-3 are determined by multiplying the horizontal candidate value $D_H^C$ by $X_A$, where $X_A$ describes the horizontal location of rectified images 554-$q$ in a column as a percentage of the difference between the horizontal location of the reference image 502 and that of the furthest column from the reference image 502, which is column C1.

In each of rectified images 554-1, 554-2, and 554-3 in FIG. 5, the actual location 554-$q$-$a$ of the pixel corresponding to reference pixel 503 differs from the expected location 554-$q$-$e$ of that pixel by a distance 505-$q$ in the horizontal direction. For example, the actual location 554-2-$a$ of the pixel in rectified image 554-2 corresponding to reference pixel 503 lies to the right of the expected location 554-2-*e* of that pixel by a distance 505-2 in the horizontal direction. These distances 505-*q* comprise errors which may weighted and summed to determine a horizontal error associated with the horizontal candidate value $D_H^C$ based upon which the expected locations 554-*q*-*e* were calculated. The embodiments are not limited in this context.

Returning to FIG. 1, in some embodiments, imaging management module 106 may be operative, for a particular horizontal candidate value $D_H^C$, to determine an associated horizontal error according to a horizontal pixel matching error function. In various embodiments, imaging management module 106 may be operative to determine the horizontal error according to the horizontal pixel matching error function as a sum of a sum of absolute differences with respect to the inverse distance between multiple camera pairs along the longest horizontal baseline. In some such embodiments, imaging management module 106 may be operative to determine the horizontal error according to the horizontal pixel matching error function described by the equation:

$$Err(D_H^c) = \sum_{n=2}^{N} e_H^n \left( D_H^c * \frac{B_{(1,n)}}{B_{(1,N)}} \right)$$

where N represents the number of columns in the rectified image array, $B_{(1,n)}$ represents the distance between the reference camera and the $n^{th}$ column, $B_{(1,N)}$ represents the distance between the reference camera and the farthest column, and $e_H^n$ represents the pairwise block matching error function defined by the equation:

$$e_H^n(D_H^c) = \Sigma_{i,j \in W} |f_{(1,1)}(x+j, y+i) - f_{(1,n)}(x+j+D_H^c, y+i)|$$

where $f$ represents the intensity function of images and W represents a window size for a sum of absolute differences block matching algorithm.

In various embodiments, in order to determine a vertical disparity factor 157-4 for rectified image array 154, imaging management module 106 may be operative to first determine a measured vertical disparity factor 157-5 for rectified image array 154. In some embodiments, the measured vertical disparity factor 157-2 may comprise an estimated number of pixels by which the vertical coordinates of any particular reference position in a reference image are expected to differ from the vertical coordinates of corresponding positions in rectified images 154-*q* residing in a furthest row from that of the reference image.

In various embodiments, imaging management module 106 may be operative to determine the measured vertical disparity factor 157-5 for the rectified image array 154 by determining a value that minimizes a total pixel matching error over a longest vertical baseline of the rectified image array 154. In some embodiments, the rectified image array 154 may comprise a plurality of rows, and the longest vertical baseline of the rectified image array 154 may comprise a distance between the extreme top row and the extreme bottom row of the rectified image array 154.

In various embodiments, imaging management module 106 may be operative to determine the measured vertical disparity factor 157-5 for the rectified image array 154 by performing an iterative process. In each iteration, a vertical candidate value may be selected that comprises a candidate value for a vertical disparity factor, and a vertical error for that vertical candidate value may be determined. In some embodiments, each vertical candidate value may represent a number of pixels. In various embodiments, in each iteration, the vertical candidate value may be determined by incrementing the vertical candidate value used in the previous iteration. In some embodiments, the iterative process may conclude when the vertical candidate value reaches a vertical disparity value limit. At the conclusion of the iterative process, the vertical candidate value with which a minimized vertical error is associated may be determined as the measured vertical disparity factor 157-5 for the rectified image array 154. In various embodiments, a vertical pixel matching error value may be computed for each vertical candidate value according to a vertical pixel matching error function. In some such embodiments, the vertical candidate value with which the minimized vertical error is associated may be determined as a vertical candidate value among those selected for evaluation for which a smallest vertical pixel matching error value is computed. The embodiments are not limited in this context.

Figure 6:
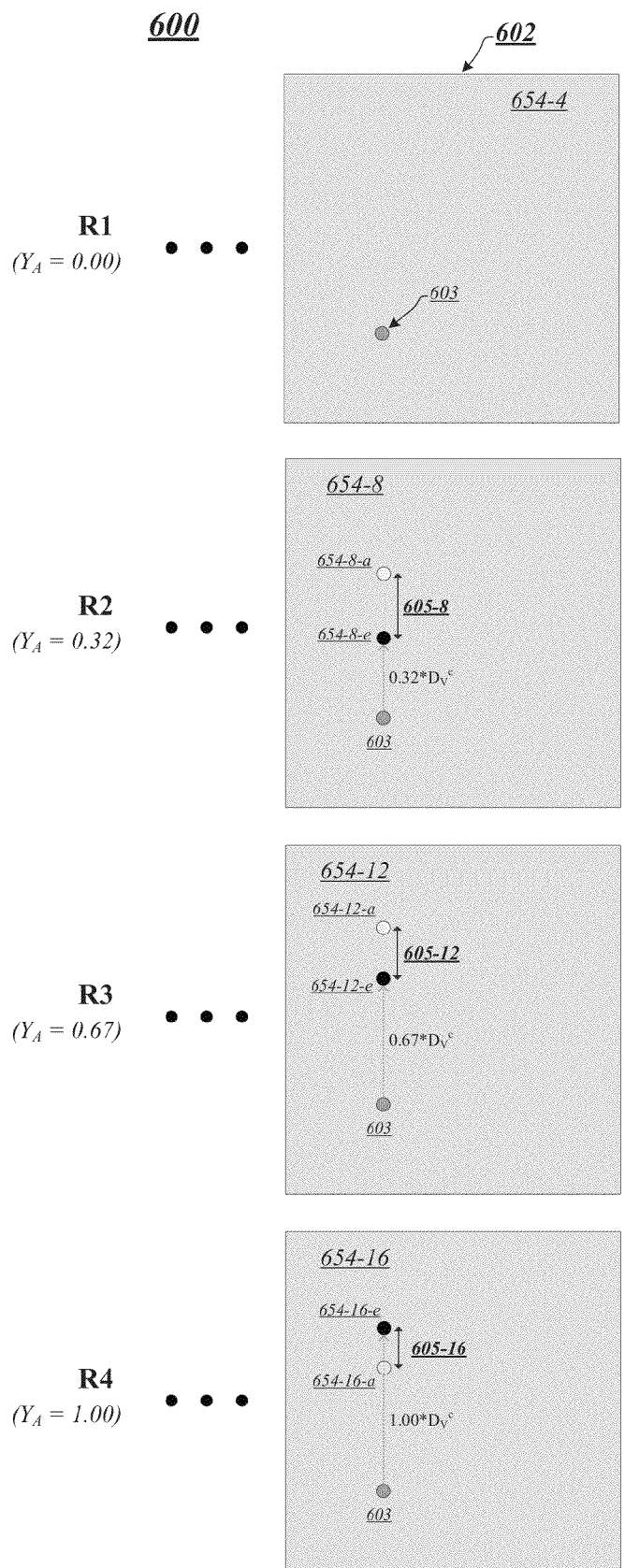
FIG. 6 illustrates one embodiment of a fourth rectified image array.

FIG. 6 illustrates an example of a rectified image array based on which a vertical error may be calculated for a vertical candidate value. Shown in FIG. 6 is a rectified image array 600, which has been truncated to display only a far right column C1. The rectified image array 600 comprises rows R1, R2, R3, and R4, in which rectified images 654-4, 654-8, 654-12, and 654-16 reside, respectively. Rectified image 654-4 is selected as a reference image 602, and a pixel therein is selected as a reference pixel 603. Shown within each of rectified images 654-8, 654-12, and 654-16 is the position corresponding to reference pixel 603, as well as respective pixels 654-*q*-*a* and 654-*q*-*e*. In each of rectified images 654-8, 654-12, and 654-16, the respective pixel 654-*q*-*a* indicates the actual position of the pixel corresponding to the reference pixel 603 in reference image 602, and the respective pixel 654-*q*-*e* indicates the expected position of that pixel, based on a vertical candidate value $D_V^c$. Similarly to FIG. 5, the expected positions 654-*q*-*e* in rectified images 654-8, 654-12, and 654-16 are determined by multiplying the vertical candidate value $D_V^c$ by $Y_A$, where $Y_A$ describes the vertical location of rectified images 654-*q* in a row as a percentage of the difference between the vertical location of the reference image 602 and that of the furthest row from the reference image 602, which is row R4.

In each of rectified images 654-8, 654-12, and 654-16 in FIG. 6, the actual location 654-*q*-*a* of the pixel corresponding to reference pixel 603 differs from the expected location 654-*q*-*e* of that pixel by a distance 605-*q* in the vertical direction. For example, the actual location 654-12-*a* of the pixel in rectified image 654-12 corresponding to reference pixel 603 lies above the expected location 654-12-*e* of that pixel by a distance 605-12 in the vertical direction. These distances 605-*q* comprise errors which may weighted and summed to determine a vertical error associated with the vertical candidate value $D_V^c$ based upon which the expected locations 654-*q*-*e* were calculated. The embodiments are not limited in this context.

Returning to FIG. 1, in various embodiments, imaging management module 106 may be operative, for a particular vertical candidate value $D_V^c$, to determine an associated vertical error according to a vertical pixel matching error function. In some embodiments, imaging management module 106 may be operative to determine the vertical error according to the vertical pixel matching error function as a sum of a sum of absolute differences with respect to the inverse distance between multiple camera pairs along the longest vertical baseline. In various such embodiments, imaging management module 106 may be operative to determine the vertical error according to the vertical pixel matching error function described by the equation:

$$Err(D_V^c) = \sum_{m=2}^{M} e_V^m \left( D_V^c * \frac{B_{(m,1)}}{B_{(M,1)}} \right)$$

where M represents the number of rows in the rectified image array, $B_{(m,1)}$ represents the distance between the reference camera and the $m^{th}$ row, $B_{(M,1)}$ represents the distance between the reference camera and the farthest row, and $e_V^m$ represents the pairwise block matching error function defined by the equation:

$$e_V^m(D_V^c) = \Sigma_{i,j \in W} |f_{(1,1)}(x+j, y+i) - f_{(m,1)}(x+j,(y+i-D_V^c))|$$

where $f$ represents the intensity function of images and W represents a window size for a sum of absolute differences block matching algorithm.

In some embodiments, imaging management module 106 may be operative to cross-check measured horizontal disparity factor 157-2 and measured vertical disparity factor 157-5 in order to determine horizontal disparity factor 157-1 and vertical disparity factor 157-4. As such, horizontal disparity factor 157-1 and vertical disparity factor 157-4 may comprise adjusted values with respect to measured horizontal disparity factor 157-2 and measured vertical disparity factor 157-5, and may comprise more accurate values than measured horizontal disparity factor 157-2 and measured vertical disparity factor 157-5. In various embodiments, imaging management module 106 may be operative to cross-check measured horizontal disparity factor 157-2 and measured vertical disparity factor 157-5 based on an ideal expected relationship between measured horizontal disparity factor 157-2 and measured vertical disparity factor 157-5. In some such embodiments, imaging management module 106 may be operative to cross-check measured horizontal disparity factor 157-2 and measured vertical disparity factor 157-5 based on the ideal expected relationship described by the equation:

$$\frac{B_H f_x}{D_H^m} = \frac{B_V f_y}{D_V^m}$$

where $D_H^m$ and $D_V^m$ represent measured horizontal disparity factor 157-2 and measured vertical disparity factor 157-5, $B_H$ and $B_V$ represent the lengths of the longest horizontal and vertical baselines of the rectified image array, and $f_x$ and $f_y$ represent the horizontal and vertical focal lengths of the reference camera in its image plane.

In various embodiments, imaging management module 106 may be operative to determine an implied horizontal disparity factor 157-3 based on measured vertical disparity factor 157-5, and to determine an implied vertical disparity factor 157-6 based on measured horizontal disparity factor 157-2. In some embodiments, imaging management module 106 may be operative to determine implied horizontal disparity factor 157-3 and implied vertical disparity factor 157-6 according to the equations:

$$D_H^i = \frac{B_H f_x}{B_V f_y} D_V^m$$

$$D_V^i = \frac{B_V f_y}{B_H f_x} D_H^m$$

where $D_H^i$; and $D_V^i$ represent implied horizontal disparity factor 157-3 and implied vertical disparity factor 157-6, respectively.

In various embodiments, imaging management module 106 may be operative to determine horizontal disparity factor 157-1 and vertical disparity factor 157-4 based on measured horizontal disparity factor 157-2, implied horizontal disparity factor 157-3, measured vertical disparity factor 157-5, and implied vertical disparity factor 157-6. In some embodiments, imaging management module 106 may be operative to determine horizontal disparity factor 157-1 by averaging measured horizontal disparity factor 157-2 and implied horizontal disparity factor 157-3, and to determine vertical disparity factor 157-4 by averaging measured vertical disparity factor 157-5 and implied vertical disparity factor 157-6. In various embodiments, imaging management module 106 may be operative to determine horizontal disparity factor 157-1 and vertical disparity factor 157-4 according to the equations:

$$D_H = \frac{1}{2}(D_H^m + D_H^i)$$

$$D_V = \frac{1}{2}(D_V^m + D_V^i)$$

where $D_H$ and $D_V$ represent horizontal disparity factor 157-1 and vertical disparity factor 157-4, respectively. Since horizontal disparity factor 157-1 may be determined as a combined function of measured horizontal disparity factor 157-2 and implied horizontal disparity factor 157-3, horizontal disparity factor 157-1 may also be termed a composite horizontal disparity factor. Likewise, since vertical disparity factor 157-4 may be determined as a combined function of measured vertical disparity factor 157-5 and implied vertical disparity factor 157-6, vertical disparity factor 157-4 may also be termed a composite vertical disparity factor. The embodiments are not limited in this context.

In some embodiments, horizontal disparity factor 157-1 may comprise a pixel value by which positions in a rectified image located on the opposite side of the longest horizontal baseline from the reference image may be horizontally translated. For example, in FIG. 4, horizontal disparity factor $D_H$ may comprise a pixel value by which positions in rectified image 454-1—which resides at the opposite end of the longest horizontal baseline from reference image 402—may be horizontally translated. Similarly, vertical disparity factor 157-4 may comprise a pixel value by which positions in a rectified image located on the opposite side of the longest vertical baseline from the reference image may be vertically translated. For example, in FIG. 4, vertical disparity factor $D_V$ may comprise a pixel value by which positions in rectified image 454-16—which resides at the opposite end of the longest vertical baseline from reference image 402—may be vertically translated. The embodiments are not limited in this context.

The rectified images 154-q in a rectified image array 154 that reside at intermediate locations along the longest horizontal and/or vertical baseline may be referred to as the intermediate rectified images 154-q in that rectified image array. For example, in rectified image array 400 of FIG. 4, rectified image 454-10 may comprise an intermediate rectified image, since it resides at an intermediate location along the longest horizontal baseline and an intermediate location along the longest vertical baseline. In various embodiments, once horizontal disparity factor 157-1 and vertical disparity factor 157-4 have been determined for a rectified image array 154, integer disparities for each intermediate rectified image 154-*q* in that rectified image array may be estimated based on the determined horizontal disparity factor 157-1 and vertical disparity factor 157-4 and on horizontal and vertical baseline ratios for that intermediate rectified image 154-*q*. Such estimated integer disparities may then be used to estimate the coordinates of positions in the intermediate rectified images 154-*q* of positions corresponding to a reference position in a reference rectified image 154-*q* in the rectified image array 154.

For example, a horizontal disparity factor $D_H$ and a vertical disparity factor $D_V$ may be determined for rectified image array 400 of FIG. 4. The position of reference pixel 403 in reference image 402 of FIG. 4 can be described as P(x,y) where x and y are the horizontal and vertical coordinates of reference pixel 403 within reference image 402. Positions within intermediate rectified images 454-*q* in rectified image array 400 that correspond to the position of reference pixel 403 in reference image 402 may be estimated based on horizontal disparity factor $D_H$ and vertical disparity factor $D_v$, and on a horizontal baseline ratio $X_A$ and a vertical baseline ratio $Y_A$ for each intermediate rectified image 454-*q*. For example, the position 454-10-1 in intermediate rectified image 454-10 that corresponds to the position of reference pixel 403 in reference image 402 may be described as $P(x+D_H*X_A(C2), y+D_V*Y_A(R3))$, where $X_A(C2)$ represents the horizontal baseline ratio $X_A$ for column C2, and $Y_A(R3)$ represents the vertical baseline ratio $Y_A$ for row R3. In the example of FIG. 4, the horizontal baseline ratio $X_A(C2)$ has a value of 0.68, and the vertical baseline ratio $Y_A(R3)$ has a value of 0.67. As such, the position 454-10-1 in intermediate rectified image 454-10 that corresponds to the position of reference pixel 403 in reference image 402 may be described as $P(x+0.068*D_H, y+0.067*D_V)$. The coordinates of corresponding positions in other intermediate rectified images 454-*q* may be computed in the same fashion. As such, integer disparities for the intermediate rectified images 454-*q* may be estimated without it being necessary to perform additional iterative candidate evaluation processes such as that performed in the course of determining the horizontal disparity factor $D_H$ and the vertical disparity factor $D_V$ for the longest horizontal and vertical baselines. The embodiments are not limited in this context.

Returning to FIG. 1, in some embodiments, horizontal disparity factor 157-1 and vertical disparity factor 157-4 may be initially determined to a unit pixel level of accuracy. In various such embodiments, imaging management module 106 may be operative to refine horizontal disparity factor 157-1 and vertical disparity factor 157-4 to a sub-pixel level of accuracy by up-scaling regions of rectified images 154-*q* and determining an optimal sub-pixel disparity factor pair comprising a horizontal sub-pixel disparity factor and a vertical sub-pixel disparity factor for the up-scaled regions. In some embodiments, the optimal sub-pixel disparity factor pair may comprise a sub-pixel disparity factor pair with which a minimized joint error for the up-scaled regions is associated. In various embodiments, a joint pixel matching error value may be computed for the up-scaled regions for each sub-pixel candidate value pair according to a joint pixel matching error function. In some such embodiments, the sub-pixel candidate value pair with which the minimized joint error is associated may be determined as a sub-pixel candidate value pair among those selected for evaluation for which a smallest joint pixel matching error is computed. In various embodiments, the joint pixel matching error function may comprise a sum of a joint pairwise block matching error function over the up-scaled regions. In some embodiments, the joint pairwise block matching error function may be described by the equation:

$$e^{(m,n)}(s,t) = \Sigma_{i,j \in W} |f_{(1,1)}(x+j,y+i) - f_{(m,n)}(x+j++s, y+i+t)|$$

where W represents a difference between the size of the up-scaled region in the reference image and the size of the up-scaled region in the image residing at row m and column n of the rectified image array 154. In various embodiments, the values of the horizontal and vertical sub-pixel disparity factors may be described by the equations:

$$d'_H = d_H \pm \frac{\mathrm{argmin}_s \sum_{m=1\ldots M; n=1\ldots N} e^{(m,n)}(s,t)}{RF}$$

$$d'_V = d_V \pm \frac{\mathrm{argmin}_t \sum_{m=1\ldots M; n=1\ldots N} e^{(m,n)}(s,t)}{RF}$$

where $d'_H$ and $d'_V$ represent the horizontal and vertical sub-pixel disparity factors, $d_H$ and $d_V$ represent the integer horizontal and vertical disparity factors, and $e^{(m,n)}(s,t)$ represents the joint pairwise block matching error function. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
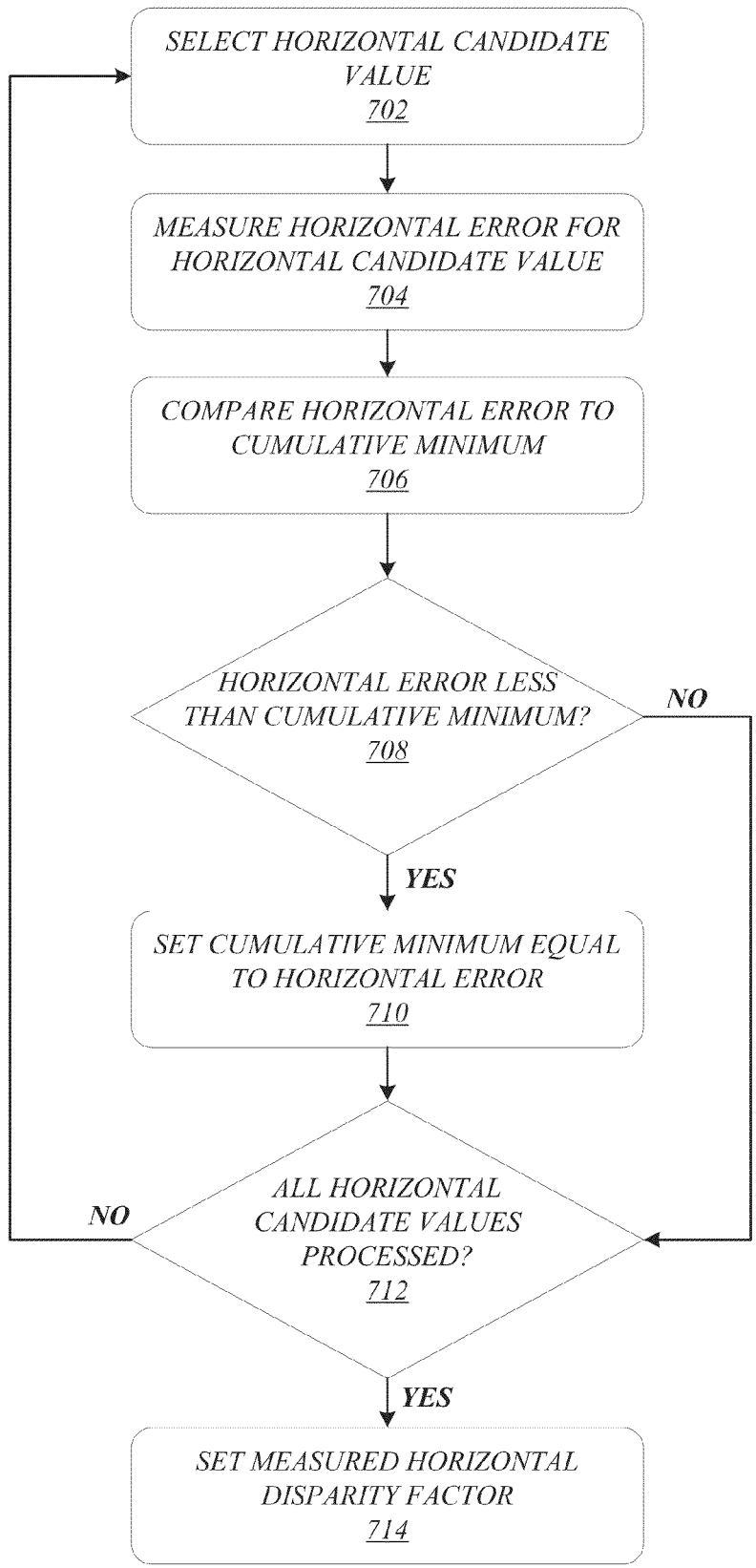
FIG. 7 illustrates one embodiment of a first logic flow.

FIG. 7 illustrates one embodiment of a logic flow 700, which may be representative of the operations executed by one or more embodiments described herein. More particularly, logic flow 700 may illustrate an example of a process for determining a measured horizontal disparity factor for a rectified image array according to various embodiments. As shown in logic flow 700, a horizontal candidate value may be selected at 702. For example, imaging management module 106 of FIG. 1 may select a horizontal candidate value. At 704, a horizontal error may be measured for the horizontal candidate value. For example, imaging management module 106 of FIG. 1 may measure a horizontal error for the horizontal candidate value. At 706, the horizontal error may be compared to a cumulative minimum horizontal error. For example, imaging management module 106 of FIG. 1 may compare the horizontal error to a cumulative minimum horizontal error. At 708, it may be determined whether the horizontal error is less than the cumulative minimum horizontal error. For example, imaging management module 106 of FIG. 1 may determine whether the horizontal error is less than the cumulative minimum horizontal error.

If it is determined at 708 that the horizontal error is less than the cumulative minimum horizontal error, flow may pass to 710. At 710, the cumulative minimum horizontal error may be set equal to the horizontal error. For example, imaging management module 106 of FIG. 1 may set the cumulative minimum horizontal error equal to the horizontal error. Flow may then pass to 712. If, at 708, it is determined that the horizontal error is not less than the cumulative minimum horizontal error, flow may pass directly to 712. At 712, it may be determined whether all horizontal candidate values have been processed. For example, imaging management module 106 of FIG. 1 may determine whether all horizontal candidate values have been processed. If it is determined that all horizontal candidate values have not been processed, flow may return to 702, where a new horizontal candidate value may be selected. If it is determined that all horizontal candidate values have been processed, flow may pass to 714. At 714, the measured horizontal disparity factor may be set equal to the horizontal candidate value corresponding to the cumulative minimum horizontal error. For example, imaging management module 106 of FIG. 1 may set the measured horizontal disparity factor 157-2 equal to the horizontal candidate value corresponding to the cumulative minimum horizontal error. The embodiments are not limited to these examples.

Figure 8:
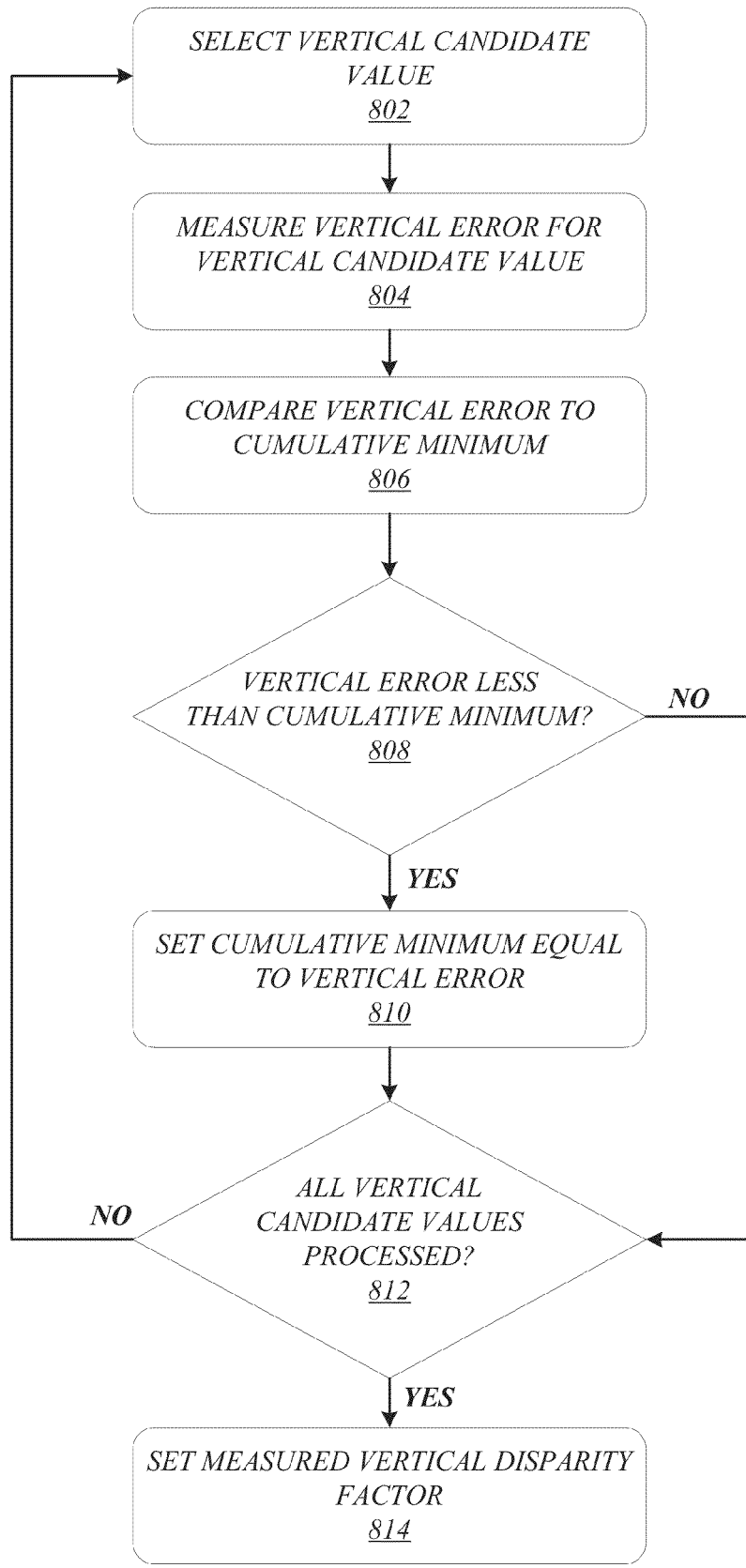
FIG. 8 illustrates one embodiment of a second logic flow.

FIG. 8 illustrates one embodiment of a logic flow 800, which may be representative of the operations executed by one or more embodiments described herein. More particularly, logic flow 800 may illustrate an example of a process for determining a measured vertical disparity factor for a rectified image array according to some embodiments. As shown in logic flow 800, a vertical candidate value may be selected at 802. For example, imaging management module 106 of FIG. 1 may select a vertical candidate value. At 804, a vertical error may be measured for the vertical candidate value. For example, imaging management module 106 of FIG. 1 may measure a vertical error for the vertical candidate value. At 806, the vertical error may be compared to a cumulative minimum vertical error. For example, imaging management module 106 of FIG. 1 may compare the vertical error to a cumulative minimum vertical error. At 808, it may be determined whether the vertical error is less than the cumulative minimum vertical error. For example, imaging management module 106 of FIG. 1 may determine whether the vertical error is less than the cumulative minimum vertical error.

If it is determined at 808 that the vertical error is less than the cumulative minimum vertical error, flow may pass to 810. At 810, the cumulative minimum vertical error may be set equal to the vertical error. For example, imaging management module 106 of FIG. 1 may set the cumulative minimum vertical error equal to the vertical error. Flow may then pass to 812. If, at 808, it is determined that the vertical error is not less than the cumulative minimum vertical error, flow may pass directly to 812. At 812, it may be determined whether all vertical candidate values have been processed. For example, imaging management module 106 of FIG. 1 may determine whether all vertical candidate values have been processed. If it is determined that all vertical candidate values have not been processed, flow may return to 802, where a new vertical candidate value may be selected. If it is determined that all vertical candidate values have been processed, flow may pass to 814. At 814, the measured vertical disparity factor may be set equal to the vertical candidate value corresponding to the cumulative minimum vertical error. For example, imaging management module 106 of FIG. 1 may set the measured vertical disparity factor 157-5 equal to the vertical candidate value corresponding to the cumulative minimum vertical error. The embodiments are not limited to these examples.

Figure 9:
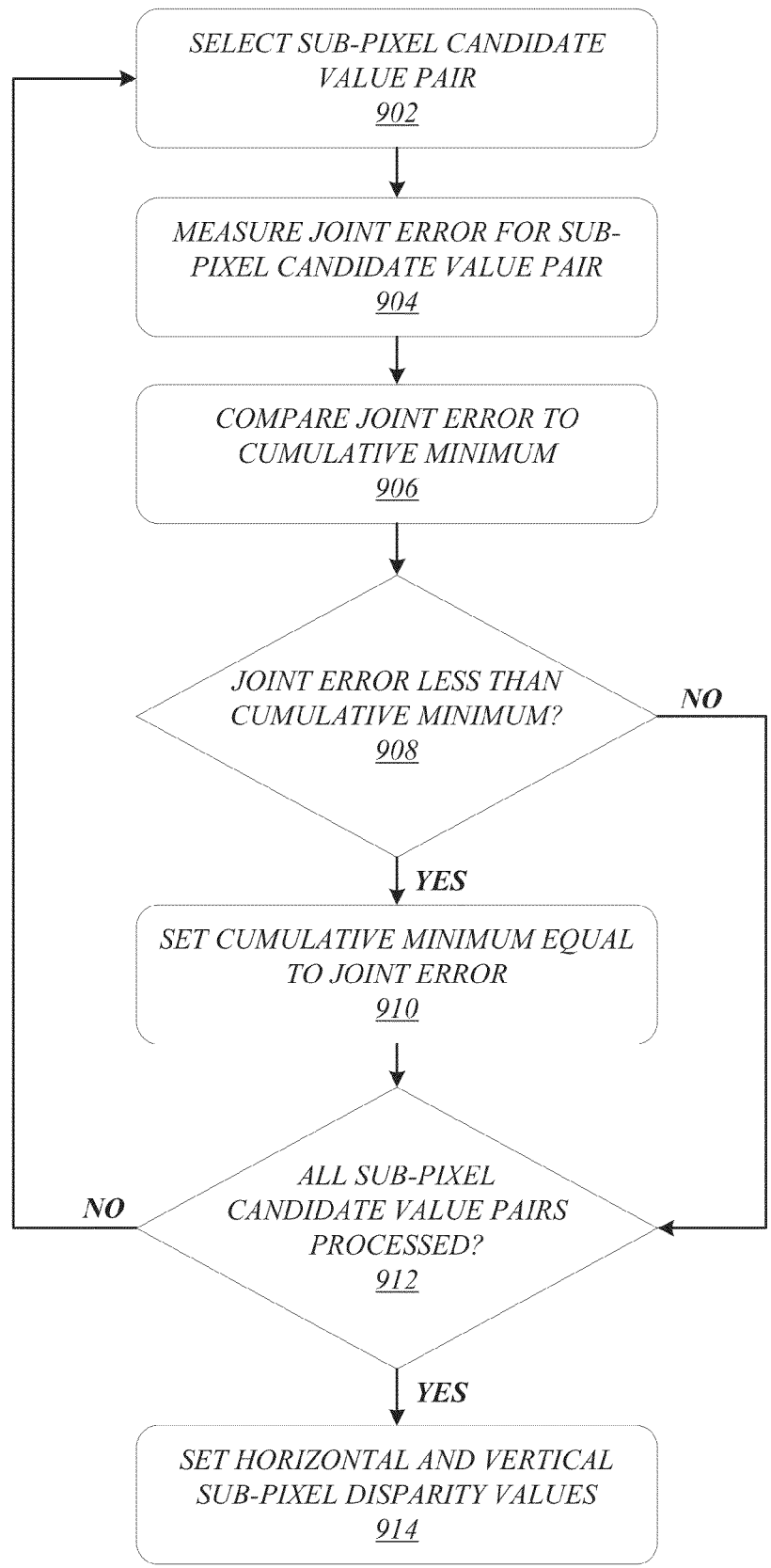
FIG. 9 illustrates one embodiment of a third logic flow.

FIG. 9 illustrates one embodiment of a logic flow 900, which may be representative of the operations executed by one or more embodiments described herein. More particularly, logic flow 900 may illustrate an example of a process for determining a horizontal sub-pixel disparity factor and a vertical sub-pixel disparity factor for a rectified image array according to various embodiments. As shown in logic flow 900, a sub-pixel candidate value pair may be selected at 902. For example, imaging management module 106 of FIG. 1 may select a sub-pixel candidate value pair. At 904, a joint error may be measured for the sub-pixel candidate value pair. For example, imaging management module 106 of FIG. 1 may measure a joint error for the sub-pixel candidate value pair. At 906, the joint error may be compared to a cumulative minimum joint error. For example, imaging management module 106 of FIG. 1 may compare the joint error to a cumulative minimum joint error. At 908, it may be determined whether the joint error is less than the cumulative minimum joint error. For example, imaging management module 106 of FIG. 1 may determine whether the joint error is less than the cumulative minimum joint error.

If it is determined at 908 that the joint error is less than the cumulative minimum joint error, flow may pass to 910. At 910, the cumulative minimum joint error may be set equal to the joint error. For example, imaging management module 106 of FIG. 1 may set the cumulative minimum joint error equal to the joint error. Flow may then pass to 912. If, at 908, it is determined that the joint error is not less than the cumulative minimum joint error, flow may pass directly to 912. At 912, it may be determined whether all sub-pixel candidate value pairs have been processed. For example, imaging management module 106 of FIG. 1 may determine whether all sub-pixel candidate value pairs have been processed. If it is determined that all sub-pixel candidate value pairs have not been processed, flow may return to 902, where a new sub-pixel candidate value pair may be selected. If it is determined that all sub-pixel candidate value pairs have been processed, flow may pass to 914. At 914, the horizontal sub-pixel disparity factor may be set equal to the horizontal sub-pixel candidate value comprised within the sub-pixel candidate value pair corresponding to the cumulative minimum joint error, and the vertical sub-pixel disparity factor may be set equal to the vertical sub-pixel candidate value comprised within the sub-pixel candidate value pair corresponding to the cumulative minimum joint error. For example, imaging management module 106 of FIG. 1 may set the horizontal sub-pixel disparity factor equal to the horizontal sub-pixel candidate value comprised within the sub-pixel candidate value pair corresponding to the cumulative minimum joint error, and may set the vertical sub-pixel disparity factor equal to the vertical sub-pixel candidate value comprised within the sub-pixel candidate value pair corresponding to the cumulative minimum joint error. The embodiments are not limited to these examples.

Figure 10:
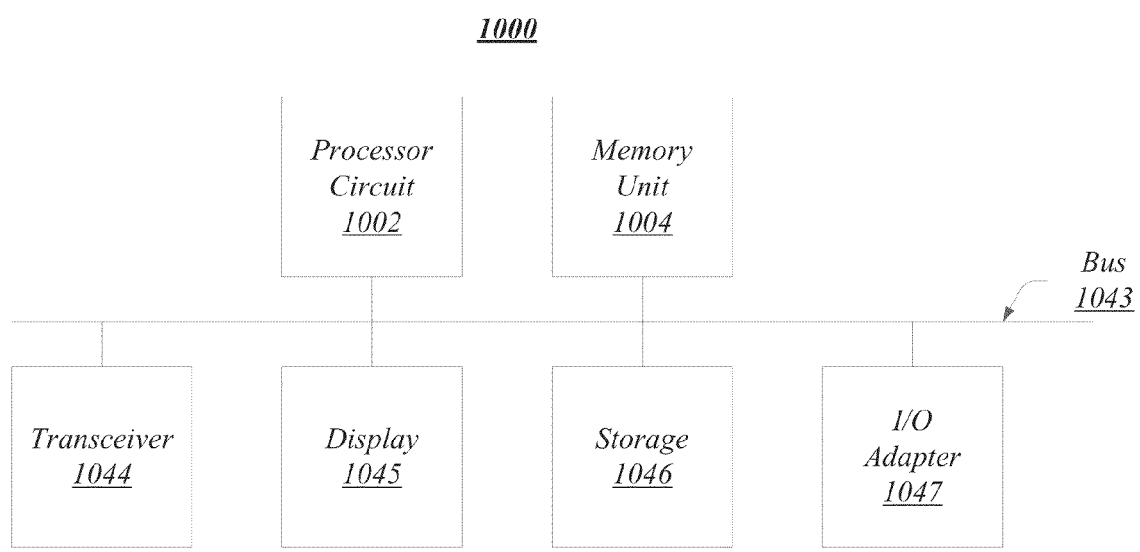
FIG. 10 illustrates one embodiment of a second system.

FIG. 10 illustrates one embodiment of a system 1000. In various embodiments, system 1000 may be representative of a system or architecture suitable for use with one or more embodiments described herein, such as apparatus 100 and/or system 140 of FIG. 1, logic flow 700 of FIG. 7, logic flow 800 of FIG. 8, and/or logic flow 900 of FIG. 9. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In various embodiments, system 1000 may include a processor circuit 1002. Processor circuit 1002 may be implemented using any processor or logic device, and may be the same as or similar to processor circuit 102 of FIG. 1.

In one embodiment, system 1000 may include a memory unit 1004 to couple to processor circuit 1002. Memory unit 1004 may be coupled to processor circuit 1002 via communications bus 1043, or by a dedicated communications bus between processor circuit 1002 and memory unit 1004, as desired for a given implementation. Memory unit 1004 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 1000 may include a transceiver 1044. Transceiver 1044 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1044 may operate in accordance with one or more applicable standards in any version. The embodiments are not limited in this context.

In various embodiments, system 1000 may include a display 1045. Display 1045 may constitute any display device capable of displaying information received from processor circuit 1002, and may be the same as or similar to display 142 of FIG. 1.

In various embodiments, system 1000 may include storage 1046. Storage 1046 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1046 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1000 may include one or more I/O adapters 1047. Examples of I/O adapters 1047 may include Universal Serial Bus (USB) ports/adapters, IEEE 1394 Firewire ports/adapters, and so forth. The embodiments are not limited in this context.

FIG. 11 illustrates an embodiment of a system 1100. In various embodiments, system 1100 may be representative of a system or architecture suitable for use with one or more embodiments described herein, such as apparatus 100 and/or system 140 of FIG. 1, logic flow 700 of FIG. 7, logic flow 800 of FIG. 8, logic flow 900 of FIG. 9, and/or system 1000 of FIG. 10. The embodiments are not limited in this respect.

As shown in FIG. 11, system 1100 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 1100 as desired for a given implementation. The embodiments are not limited in this context.

In embodiments, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1100 includes a platform 1101 coupled to a display 1145. Platform 1101 may receive content from a content device such as content services device(s) 1148 or content delivery device(s) 1149 or other similar content sources. A navigation controller 1150 including one or more navigation features may be used to interact with, for example, platform 1101 and/or display 1145. Each of these components is described in more detail below.

In embodiments, platform 1101 may include any combination of a processor circuit 1102, chipset 1103, memory unit 1104, transceiver 1144, storage 1146, applications 1151, and/or graphics subsystem 1152. Chipset 1103 may provide intercommunication among processor circuit 1102, memory unit 1104, transceiver 1144, storage 1146, applications 1151, and/or graphics subsystem 1152. For example, chipset 1103 may include a storage adapter (not depicted) capable of providing intercommunication with storage 1146.

Processor circuit 1102 may be implemented using any processor or logic device, and may be the same as or similar to processor circuit 1002 in FIG. 10.

Memory unit 1104 may be implemented using any machine-readable or computer-readable media capable of storing data, and may be the same as or similar to memory unit 1004 in FIG. 10.

Transceiver 1144 may include one or more radios capable of transmitting and receiving signals using various suitable wireless communications techniques, and may be the same as or similar to transceiver 1044 in FIG. 10.

Display 1145 may include any television type monitor or display, and may be the same as or similar to display 1045 in FIG. 10.

Storage 1146 may be implemented as a non-volatile storage device, and may be the same as or similar to storage 1046 in FIG. 10.

Graphics subsystem 1152 may perform processing of images such as still or video for display. Graphics subsystem 1152 may be a graphics processing unit (GPU) or a visual processing unit (VPU), for example. An analog or digital interface may be used to communicatively couple graphics subsystem 1152 and display 1145. For example, the interface may be any of a High-Definition Multimedia Interface, DisplayPort, wireless HDMI, and/or wireless HD compliant techniques. Graphics subsystem 1152 could be integrated into processor circuit 1102 or chipset 1103. Graphics subsystem 1152 could be a stand-alone card communicatively coupled to chipset 1103.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1148 may be hosted by any national, international and/or independent service and thus accessible to platform 1101 via the Internet, for example. Content services device(s) 1148 may be coupled to platform 1101 and/or to display 1145. Platform 1101 and/or content services device(s) 1148 may be coupled to a network 1153 to communicate (e.g., send and/or receive) media information to and from network 1153. Content delivery device(s) 1149 also may be coupled to platform 1101 and/or to display 1145.

In embodiments, content services device(s) 1148 may include a cable television box, personal computer, network, telephone, Internet enabled devices or appliance capable of delivering digital information and/or content, and any other similar device capable of unidirectionally or bidirectionally communicating content between content providers and platform 1101 and/display 1145, via network 1153 or directly. It will be appreciated that the content may be communicated unidirectionally and/or bidirectionally to and from any one of the components in system 1100 and a content provider via network 1153. Examples of content may include any media information including, for example, video, music, medical and gaming information, and so forth.

Content services device(s) 1148 receives content such as cable television programming including media information, digital information, and/or other content. Examples of content providers may include any cable or satellite television or radio or Internet content providers. The provided examples are not meant to limit embodiments of the invention.

In embodiments, platform 1101 may receive control signals from navigation controller 1150 having one or more navigation features. The navigation features of navigation controller 1150 may be used to interact with a user interface 1154, for example. In embodiments, navigation controller 1150 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be echoed on a display (e.g., display 1145) by movements of a pointer, cursor, focus ring, or other visual indicators displayed on the display. For example, under the control of software applications 1151, the navigation features located on navigation controller 1150 may be mapped to virtual navigation features displayed on user interface 1154. In embodiments, navigation controller 1150 may not be a separate component but integrated into platform 1101 and/or display 1145. Embodiments, however, are not limited to the elements or in the context shown or described herein.

In embodiments, drivers (not shown) may include technology to enable users to instantly turn on and off platform 1101 like a television with the touch of a button after initial boot-up, when enabled, for example. Program logic may allow platform 1101 to stream content to media adaptors or other content services device(s) 1148 or content delivery device(s) 1149 when the platform is turned "off." In addition, chip set 1103 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1100 may be integrated. For example, platform 1101 and content services device(s) 1148 may be integrated, or platform 1101 and content delivery device(s) 1149 may be integrated, or platform 1101, content services device(s) 1148, and content delivery device(s) 1149 may be integrated, for example. In various embodiments, platform 1101 and display 1145 may be an integrated unit. Display 1145 and content service device(s) 1148 may be integrated, or display 1145 and content delivery device(s) 1149 may be integrated, for example. These examples are not meant to limit the invention.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1101 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
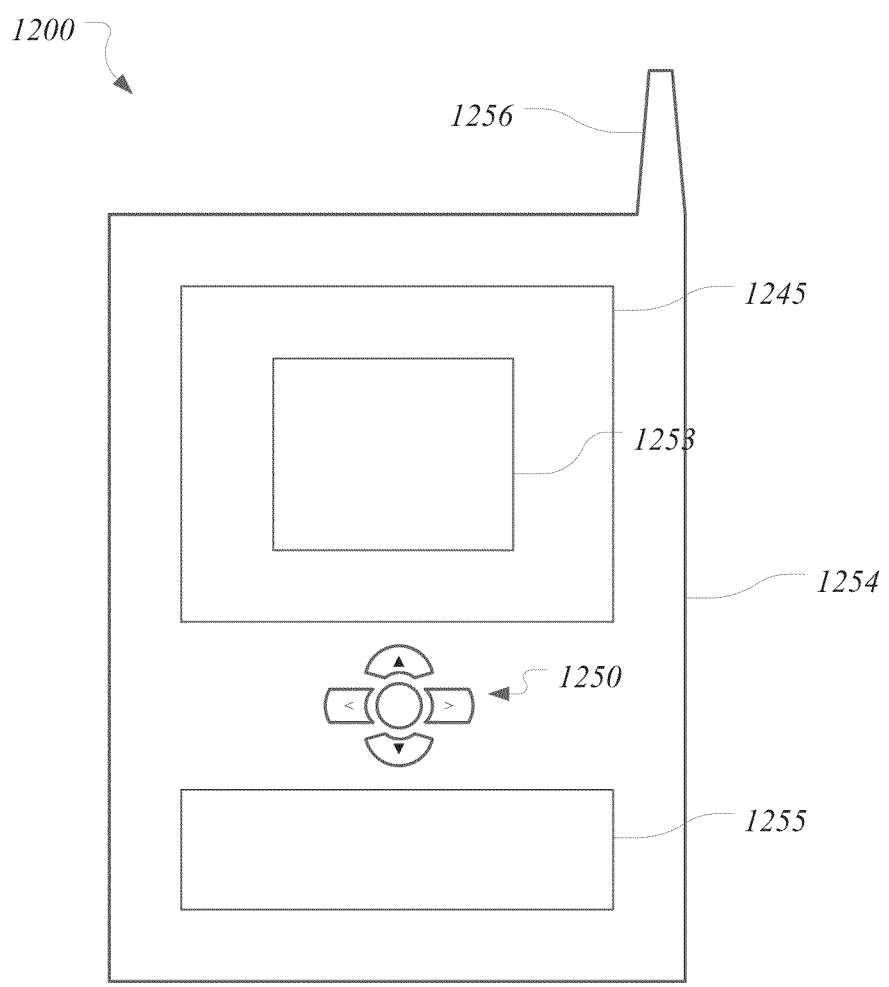
FIG. 12 illustrates one embodiment of a device.

As described above, system 1100 may be embodied in varying physical styles or form factors. FIG. 12 illustrates embodiments of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a display 1245, a navigation controller 1250, a user interface 1254, a housing 1255, an I/O device 1256, and an antenna 1257. Display 1245 may include any suitable display unit for displaying information appropriate for a mobile computing device, and may be the same as or similar to display 1145 in FIG. 11. Navigation controller 1250 may include one or more navigation features which may be used to interact with user interface 1254, and may be the same as or similar to navigation controller 1150 in FIG. 11. I/O device 1256 may include any suitable I/O device for entering information into a mobile computing device. Examples for I/O device 1256 may include an alphanumeric keyboard, a numeric keypad, a touch pad, input keys, buttons, switches, rocker switches, microphones, speakers, voice recognition device and software, and so forth. Information also may be entered into device 1200 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

At least one machine-readable medium may comprise a plurality of instructions that, in response to being executed on a computing device, cause the computing device to determine a measured horizontal disparity factor for a rectified image array comprising a plurality of rectified images by a first process arranged to iteratively select a horizontal candidate value, measure a horizontal error associated with the selected horizontal candidate value, and determine as the measured horizontal disparity factor a horizontal candidate value with which a minimized horizontal error is associated, and determine a measured vertical disparity factor for the rectified image array by a second process arranged to iteratively select a vertical candidate value, measure a vertical error associated with the selected vertical candidate value, and determine as the measured vertical disparity factor a vertical candidate value with which a minimized vertical error is associated.

Such at least one machine-readable medium may comprise instructions that, in response to being executed on the computing device, cause the computing device to determine an implied horizontal disparity factor for the rectified image array based on the measured vertical disparity factor and determine an implied vertical disparity factor for the rectified image array based on the measured horizontal disparity factor.

Such at least one machine-readable medium may comprise instructions that, in response to being executed on the computing device, cause the computing device to determine a composite horizontal disparity factor for the rectified image array based on the measured horizontal disparity factor and the implied horizontal disparity factor, and determine a composite vertical disparity factor for the rectified image array based on the measured vertical disparity factor and the implied vertical disparity factor.

With respect to such at least one machine-readable medium, the minimized horizontal error may comprise a minimum value of a horizontal pixel matching error function, and the minimized vertical error may comprise a minimum value of a vertical pixel matching error function.

With respect to such at least one machine-readable medium, the horizontal pixel matching error function and the vertical pixel matching error function may comprise sums of pairwise block matching error functions.

Such at least one machine-readable medium may comprise instructions that, in response to being executed on the computing device, cause the computing device to determine the measured horizontal disparity factor for a longest horizontal baseline of the rectified image array and determine the measured vertical disparity factor for a longest vertical baseline of the rectified image array.

With respect to such at least one machine-readable medium, one or both of the measured horizontal disparity factor or the measured vertical disparity factor may comprise a number of pixels.

With respect to such at least one machine-readable medium, the composite horizontal disparity factor and the composite vertical disparity factor may comprise integer pixel disparities.

Such at least one machine-readable medium may comprise instructions that, in response to being executed on the computing device, cause the computing device to determine a horizontal sub-pixel disparity factor and a vertical sub-pixel disparity factor for the rectified image array by a third process arranged to iteratively select a sub-pixel candidate value pair comprising a horizontal sub-pixel candidate value and a vertical sub-pixel candidate value, measure a joint error associated with the selected sub-pixel candidate value pair, determine as the horizontal sub-pixel disparity factor a horizontal sub-pixel candidate value comprised within a sub-pixel candidate value pair with which a minimized joint error is associated, and determine as the vertical sub-pixel disparity factor a vertical sub-pixel candidate value comprised within the sub-pixel candidate value pair with which the minimized joint error is associated.

An apparatus may comprise a processor circuit and an imaging management module to determine a measured horizontal disparity factor for a rectified image array comprising a plurality of rectified images by a first process arranged to iteratively select a horizontal candidate value, measure a horizontal error associated with the selected horizontal candidate value, and determine as the measured horizontal disparity factor a horizontal candidate value with which a minimized horizontal error is associated, and determine a measured vertical disparity factor for the rectified image array by a second process arranged to iteratively select a vertical candidate value, measure a vertical error associated with the selected vertical candidate value, and determine as the measured vertical disparity factor a vertical candidate value with which a minimized vertical error is associated.

With respect to such an apparatus, the imaging management module may determine an implied horizontal disparity factor for the rectified image array based on the measured vertical disparity factor and determine an implied vertical disparity factor for the rectified image array based on the measured horizontal disparity factor.

With respect to such an apparatus, the imaging management module may determine a composite horizontal disparity factor for the rectified image array based on the measured horizontal disparity factor and the implied horizontal disparity factor, and determine a composite vertical disparity factor for the rectified image array based on the measured vertical disparity factor and the implied vertical disparity factor.

With respect to such an apparatus, the minimized horizontal error may comprise a minimum value of a horizontal pixel matching error function, and the minimized vertical error may comprise a minimum value of a vertical pixel matching error function.

With respect to such an apparatus, the horizontal pixel matching error function and the vertical pixel matching error function may comprise sums of pairwise block matching error functions.

With respect to such an apparatus, the imaging management module may determine the measured horizontal disparity factor for a longest horizontal baseline of the rectified image array and determine the measured vertical disparity factor for a longest vertical baseline of the rectified image array.

With respect to such an apparatus, one or both of the measured horizontal disparity factor or the measured vertical disparity factor may comprise a number of pixels.

With respect to such an apparatus, the composite horizontal disparity factor and the composite vertical disparity factor may comprise integer pixel disparities.

With respect to such an apparatus, the imaging management module may determine a horizontal sub-pixel disparity factor and a vertical sub-pixel disparity factor for the rectified image array by a third process arranged to iteratively select a sub-pixel candidate value pair comprising a horizontal sub-pixel candidate value and a vertical sub-pixel candidate value, measure a joint error associated with the selected sub-pixel candidate value pair, determine as the horizontal sub-pixel disparity factor a horizontal sub-pixel candidate value comprised within a sub-pixel candidate value pair with which a minimized joint error is associated, and determine as the vertical sub-pixel disparity factor a vertical sub-pixel candidate value comprised within the sub-pixel candidate value pair with which the minimized joint error is associated.

A method may comprise determining a measured horizontal disparity factor for a rectified image array comprising a plurality of rectified images by performing a first process comprising iteratively selecting a horizontal candidate value, measuring a horizontal error associated with the selected horizontal candidate value, and determining as the measured horizontal disparity factor a horizontal candidate value with which a minimized horizontal error is associated and determining a measured vertical disparity factor for the rectified image array by performing a second process comprising iteratively selecting a vertical candidate value, measuring a vertical error associated with the selected vertical candidate value, and determining as the measured vertical disparity factor a vertical candidate value with which a minimized vertical error is associated.

Such a method may comprise determining an implied horizontal disparity factor for the rectified image array based on the measured vertical disparity factor and determining an implied vertical disparity factor for the rectified image array based on the measured horizontal disparity factor.

Such a method may comprise determining a composite horizontal disparity factor for the rectified image array based on the measured horizontal disparity factor and the implied horizontal disparity factor, and determining a composite vertical disparity factor for the rectified image array based on the measured vertical disparity factor and the implied vertical disparity factor.

With respect to such a method, the minimized horizontal error may comprise a minimum value of a horizontal pixel matching error function, the minimized vertical error comprising a minimum value of a vertical pixel matching error function.

With respect to such a method, the horizontal pixel matching error function and the vertical pixel matching error function may comprise sums of pairwise block matching error functions.

Such a method may comprise determining the measured horizontal disparity factor for a longest horizontal baseline of the rectified image array and determining the measured vertical disparity factor for a longest vertical baseline of the rectified image array.

Such a method may comprise determining a horizontal sub-pixel disparity factor and a vertical sub-pixel disparity factor for the rectified image array by performing a third process comprising iteratively selecting a sub-pixel candidate value pair comprising a horizontal sub-pixel candidate value and a vertical sub-pixel candidate value, measuring a joint error associated with the selected sub-pixel candidate value pair, determining as the horizontal sub-pixel disparity factor a horizontal sub-pixel candidate value comprised within a sub-pixel candidate value pair with which a minimized joint error is associated, and determining as the vertical sub-pixel disparity factor a vertical sub-pixel candidate value comprised within the sub-pixel candidate value pair with which the minimized joint error is associated.

A system may comprise a processor circuit, a camera array comprising a plurality of cameras, and an imaging management module to determine a measured horizontal disparity factor for a rectified image array comprising a plurality of rectified images of the plurality of cameras by a first process arranged to iteratively select a horizontal candidate value, measure a horizontal error associated with the selected horizontal candidate value, and determine as the measured horizontal disparity factor a horizontal candidate value with which a minimized horizontal error is associated, and determine a measured vertical disparity factor for the rectified image array by a second process arranged to iteratively select a vertical candidate value, measure a vertical error associated with the selected vertical candidate value, and determine as the measured vertical disparity factor a vertical candidate value with which a minimized vertical error is associated.

With respect to such a system, the imaging management module may determine an implied horizontal disparity factor for the rectified image array based on the measured vertical disparity factor and determine an implied vertical disparity factor for the rectified image array based on the measured horizontal disparity factor.

With respect to such a system, the imaging management module may determine a composite horizontal disparity factor for the rectified image array based on the measured horizontal disparity factor and the implied horizontal disparity factor, and determine a composite vertical disparity factor for the rectified image array based on the measured vertical disparity factor and the implied vertical disparity factor.

With respect to such a system, the minimized horizontal error may comprise a minimum value of a horizontal pixel matching error function, the minimized vertical error may comprise a minimum value of a vertical pixel matching error function, and the horizontal pixel matching error function and the vertical pixel matching error function may comprise sums of pairwise block matching error functions.

With respect to such a system, the imaging management module may determine a horizontal sub-pixel disparity factor and a vertical sub-pixel disparity factor for the rectified image array by a third process arranged to iteratively select a sub-pixel candidate value pair comprising a horizontal sub-pixel candidate value and a vertical sub-pixel candidate value, measure a joint error associated with the selected sub-pixel candidate value pair, determine as the horizontal sub-pixel disparity factor a horizontal sub-pixel candidate value comprised within a sub-pixel candidate value pair with which a minimized joint error is associated, and determine as the vertical sub-pixel disparity factor a vertical sub-pixel candidate value comprised within the sub-pixel candidate value pair with which the minimized joint error is associated.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:
   determine a measured horizontal disparity factor for a rectified image array comprising a plurality of rectified images by a first process arranged to:
   iteratively select a horizontal candidate value;
   measure a horizontal error associated with the selected horizontal candidate value; and
   determine as the measured horizontal disparity factor a horizontal candidate value with which a minimized horizontal error is associated; and
   determine a measured vertical disparity factor for the rectified image array by a second process arranged to:
   iteratively select a vertical candidate value;
   measure a vertical error associated with the selected vertical candidate value; and
   determine as the measured vertical disparity factor a vertical candidate value with which a minimized vertical error is associated.

2. The at least one machine-readable medium of claim 1, comprising instructions that, in response to being executed on the computing device, cause the computing device to:
   determine an implied horizontal disparity factor for the rectified image array based on the measured vertical disparity factor; and
   determine an implied vertical disparity factor for the rectified image array based on the measured horizontal disparity factor.

3. The at least one machine-readable medium of claim 2, comprising instructions that, in response to being executed on the computing device, cause the computing device to:
   determine a composite horizontal disparity factor for the rectified image array based on the measured horizontal disparity factor and the implied horizontal disparity factor; and
   determine a composite vertical disparity factor for the rectified image array based on the measured vertical disparity factor and the implied vertical disparity factor.

4. The at least one machine-readable medium of claim 1, the minimized horizontal error comprising a minimum value of a horizontal pixel matching error function, the minimized vertical error comprising a minimum value of a vertical pixel matching error function.

5. The at least one machine-readable medium of claim 4, the horizontal pixel matching error function and the vertical pixel matching error function comprising sums of pairwise block matching error functions.

6. The at least one machine-readable medium of claim 1, comprising instructions that, in response to being executed on the computing device, cause the computing device to:
   determine the measured horizontal disparity factor for a longest horizontal baseline of the rectified image array; and
   determine the measured vertical disparity factor for a longest vertical baseline of the rectified image array.

7. The at least one machine-readable medium of claim 1, one or both of the measured horizontal disparity factor or the measured vertical disparity factor comprising a number of pixels.

8. The at least one machine-readable medium of claim 3, the composite horizontal disparity factor and the composite vertical disparity factor comprising integer pixel disparities.

9. The at least one machine-readable medium of claim 8, comprising instructions that, in response to being executed on the computing device, cause the computing device to:
   determine a horizontal sub-pixel disparity factor and a vertical sub-pixel disparity factor for the rectified image array by a third process arranged to:
   iteratively select a sub-pixel candidate value pair comprising a horizontal sub-pixel candidate value and a vertical sub-pixel candidate value;
   measure a joint error associated with the selected sub-pixel candidate value pair;
   determine as the horizontal sub-pixel disparity factor a horizontal sub-pixel candidate value comprised within a sub-pixel candidate value pair with which a minimized joint error is associated; and
   determine as the vertical sub-pixel disparity factor a vertical sub-pixel candidate value comprised within the sub-pixel candidate value pair with which the minimized joint error is associated.

10. An apparatus, comprising:
    a processor circuit; and
    an imaging management module to:
    determine a measured horizontal disparity factor for a rectified image array comprising a plurality of rectified images by a first process arranged to:
    iteratively select a horizontal candidate value;
    measure a horizontal error associated with the selected horizontal candidate value; and
    determine as the measured horizontal disparity factor a horizontal candidate value with which a minimized horizontal error is associated; and
    determine a measured vertical disparity factor for the rectified image array by a second process arranged to:
    iteratively select a vertical candidate value;
    measure a vertical error associated with the selected vertical candidate value; and
    determine as the measured vertical disparity factor a vertical candidate value with which a minimized vertical error is associated.

11. The apparatus of claim 10, the imaging management module to:
    determine an implied horizontal disparity factor for the rectified image array based on the measured vertical disparity factor; and
    determine an implied vertical disparity factor for the rectified image array based on the measured horizontal disparity factor.

12. The apparatus of claim 11, the imaging management module to:
  determine a composite horizontal disparity factor for the rectified image array based on the measured horizontal disparity factor and the implied horizontal disparity factor; and
  determine a composite vertical disparity factor for the rectified image array based on the measured vertical disparity factor and the implied vertical disparity factor.

13. The apparatus of claim 10, the minimized horizontal error comprising a minimum value of a horizontal pixel matching error function, the minimized vertical error comprising a minimum value of a vertical pixel matching error function.

14. The apparatus of claim 13, the horizontal pixel matching error function and the vertical pixel matching error function comprising sums of pairwise block matching error functions.

15. The apparatus of claim 10, the imaging management module to:
  determine the measured horizontal disparity factor for a longest horizontal baseline of the rectified image array; and
  determine the measured vertical disparity factor for a longest vertical baseline of the rectified image array.

16. The apparatus of claim 10, one or both of the measured horizontal disparity factor or the measured vertical disparity factor comprising a number of pixels.

17. The apparatus of claim 12, the composite horizontal disparity factor and the composite vertical disparity factor comprising integer pixel disparities.

18. The apparatus of claim 17, the imaging management module to:
  determine a horizontal sub-pixel disparity factor and a vertical sub-pixel disparity factor for the rectified image array by a third process arranged to:
    iteratively select a sub-pixel candidate value pair comprising a horizontal sub-pixel candidate value and a vertical sub-pixel candidate value;
    measure a joint error associated with the selected sub-pixel candidate value pair;
    determine as the horizontal sub-pixel disparity factor a horizontal sub-pixel candidate value comprised within a sub-pixel candidate value pair with which a minimized joint error is associated; and
    determine as the vertical sub-pixel disparity factor a vertical sub-pixel candidate value comprised within the sub-pixel candidate value pair with which the minimized joint error is associated.

19. A method, comprising:
  determining a measured horizontal disparity factor for a rectified image array comprising a plurality of rectified images by performing a first process comprising:
    iteratively selecting a horizontal candidate value;
    measuring a horizontal error associated with the selected horizontal candidate value; and
    determining as the measured horizontal disparity factor a horizontal candidate value with which a minimized horizontal error is associated; and
  determining a measured vertical disparity factor for the rectified image array by performing a second process comprising:
    iteratively selecting a vertical candidate value;
    measuring a vertical error associated with the selected vertical candidate value; and
    determining as the measured vertical disparity factor a vertical candidate value with which a minimized vertical error is associated.

20. The method of claim 19, comprising:
  determining an implied horizontal disparity factor for the rectified image array based on the measured vertical disparity factor; and
  determining an implied vertical disparity factor for the rectified image array based on the measured horizontal disparity factor.

21. The method of claim 20, comprising:
  determining a composite horizontal disparity factor for the rectified image array based on the measured horizontal disparity factor and the implied horizontal disparity factor; and
  determining a composite vertical disparity factor for the rectified image array based on the measured vertical disparity factor and the implied vertical disparity factor.

22. The method of claim 19, the minimized horizontal error comprising a minimum value of a horizontal pixel matching error function, the minimized vertical error comprising a minimum value of a vertical pixel matching error function.

23. The method of claim 22, the horizontal pixel matching error function and the vertical pixel matching error function comprising sums of pairwise block matching error functions.

24. The method of claim 19, comprising:
  determining the measured horizontal disparity factor for a longest horizontal baseline of the rectified image array; and
  determining the measured vertical disparity factor for a longest vertical baseline of the rectified image array.

25. The method of claim 21, comprising:
  determining a horizontal sub-pixel disparity factor and a vertical sub-pixel disparity factor for the rectified image array by performing a third process comprising:
    iteratively selecting a sub-pixel candidate value pair comprising a horizontal sub-pixel candidate value and a vertical sub-pixel candidate value;
    measuring a joint error associated with the selected sub-pixel candidate value pair;
    determining as the horizontal sub-pixel disparity factor a horizontal sub-pixel candidate value comprised within a sub-pixel candidate value pair with which a minimized joint error is associated; and
    determining as the vertical sub-pixel disparity factor a vertical sub-pixel candidate value comprised within the sub-pixel candidate value pair with which the minimized joint error is associated.

26. A system, comprising:
  a processor circuit;
  a camera array comprising a plurality of cameras; and
  an imaging management module to:
    determine a measured horizontal disparity factor for a rectified image array comprising a plurality of rectified images of the plurality of cameras by a first process arranged to:
      iteratively select a horizontal candidate value;
      measure a horizontal error associated with the selected horizontal candidate value; and
      determine as the measured horizontal disparity factor a horizontal candidate value with which a minimized horizontal error is associated; and
    determine a measured vertical disparity factor for the rectified image array by a second process arranged to:
      iteratively select a vertical candidate value;
      measure a vertical error associated with the selected vertical candidate value; and determine as the measured vertical disparity factor a vertical candidate value with which a minimized vertical error is associated.

27. The system of claim 26, the imaging management module to:
    determine an implied horizontal disparity factor for the rectified image array based on the measured vertical disparity factor; and
    determine an implied vertical disparity factor for the rectified image array based on the measured horizontal disparity factor.

28. The system of claim 27, the imaging management module to:
    determine a composite horizontal disparity factor for the rectified image array based on the measured horizontal disparity factor and the implied horizontal disparity factor; and
    determine a composite vertical disparity factor for the rectified image array based on the measured vertical disparity factor and the implied vertical disparity factor.

29. The system of claim 26, the minimized horizontal error comprising a minimum value of a horizontal pixel matching error function, the minimized vertical error comprising a minimum value of a vertical pixel matching error function, the horizontal pixel matching error function and the vertical pixel matching error function comprising sums of pairwise block matching error functions.

30. The system of claim 28, the imaging management module to:
    determine a horizontal sub-pixel disparity factor and a vertical sub-pixel disparity factor for the rectified image array by a third process arranged to:
        iteratively select a sub-pixel candidate value pair comprising a horizontal sub-pixel candidate value and a vertical sub-pixel candidate value;
        measure a joint error associated with the selected sub-pixel candidate value pair;
        determine as the horizontal sub-pixel disparity factor a horizontal sub-pixel candidate value comprised within a sub-pixel candidate value pair with which a minimized joint error is associated; and
        determine as the vertical sub-pixel disparity factor a vertical sub-pixel candidate value comprised within the sub-pixel candidate value pair with which the minimized joint error is associated.

\* \* \* \* \*